(12) United States Patent
Dodworth

(10) Patent No.: US 10,786,977 B2
(45) Date of Patent: *Sep. 29, 2020

(54) COMPOSITE SANDWICH HAVING A HIGH BENDING STIFFNESS

(71) Applicant: BRIGHT LITE STRUCTURES LLC, San Francisco, CA (US)

(72) Inventor: Antony Dodworth, Stamford (GB)

(73) Assignee: BRIGHT LITE STRUCTURES LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/311,703

(22) PCT Filed: Jun. 3, 2015

(86) PCT No.: PCT/US2015/034070
§ 371 (c)(1),
(2) Date: Nov. 16, 2016

(87) PCT Pub. No.: WO2016/028359
PCT Pub. Date: Feb. 25, 2016

(65) Prior Publication Data
US 2017/0087798 A1 Mar. 30, 2017

Related U.S. Application Data

(60) Provisional application No. 62/108,837, filed on Jan. 28, 2015, provisional application No. 62/007,670, filed on Jun. 4, 2014, provisional application No. 62/007,632, filed on Jun. 4, 2014, provisional application No. 62/007,614, filed on Jun. 4, 2014, provisional application No. 62/007,652, filed on Jun. 4, 2014, provisional application No. 62/007,685, filed on Jun. 4, 2014.

(51) Int. Cl.
*B32B 27/12* (2006.01)
*B29D 24/00* (2006.01)
(Continued)

(52) U.S. Cl.
CPC ............... *B32B 27/12* (2013.01); *B29B 7/88* (2013.01); *B29B 13/02* (2013.01); *B29C 43/203* (2013.01); *B29C 43/34* (2013.01); *B29C 43/56* (2013.01); *B29C 44/1209* (2013.01); *B29C 70/02* (2013.01); *B29C 70/305* (2013.01); *B29C 70/34* (2013.01); *B29C 70/345* (2013.01); *B29D 24/005* (2013.01); *B32B 3/12* (2013.01); *B32B 3/20* (2013.01); *B32B 5/02* (2013.01); *B32B 5/024* (2013.01); *B32B 5/18* (2013.01); *B32B 5/245* (2013.01); *B32B 27/065* (2013.01); *B32B 27/10* (2013.01); *B32B 27/20* (2013.01); *B32B 27/38* (2013.01); *B32B 27/365* (2013.01); *B32B 27/38* (2013.01); *B32B 27/40* (2013.01); *B32B 37/146* (2013.01); *C08G 18/003* (2013.01); *B29C 44/1285* (2013.01); *B29C 67/205* (2013.01); *B29C 2043/561* (2013.01); *B29C 2043/568* (2013.01); *B29K 2023/06* (2013.01); *B29K 2063/00* (2013.01); *B29K 2069/00* (2013.01); *B29K 2075/00* (2013.01); *B29K 2105/04* (2013.01); *B29K 2105/041* (2013.01); *B29K 2105/0872* (2013.01); *B29K 2105/16* (2013.01); *B29K 2105/251* (2013.01); *B29K 2307/04* (2013.01); *B29K 2509/00* (2013.01);
(Continued)

(58) Field of Classification Search
CPC ....... B29C 43/56; B29C 43/209; B29C 70/34; B29C 70/305; B29C 44/1209; B29C 70/345; B29C 70/02; B29C 43/34; B29C 2043/568; B29C 2043/561; B29C 67/205; B29C 44/1285; B32B 27/365; B32B 5/02; B32B 5/18; B32B 3/20; B32B 37/146; B32B 27/38; B32B 27/10; B32B 5/024; B32B 13/02; B32B 7/88; B32B 27/40; B32B 27/20; B32B 5/245; B32B 27/065; B32B 27/12; B32B 3/12; B32B 2605/00; B32B 2038/0024; B32B 2305/076; B32B 2305/022; C08G 18/003; B29D 24/005; B29K 2105/251; B29K 2509/00; B29K 2307/04; B29K 2105/16; B29K 2105/04; B29K 2075/00; B29K 2063/00; B29K 2023/06; B29K 2105/041; B29K 2105/0872; B29K 2069/00; B25L 2009/00; B29L 2031/30
See application file for complete search history.

(56) References Cited

U.S. PATENT DOCUMENTS 2,882,673 A    4/1959  Heinrich
3,051,992 A    9/1962  Bradley
(Continued)

FOREIGN PATENT DOCUMENTS

CN    201566184 U    9/2010
CN    101946051 A    1/2011
(Continued)

OTHER PUBLICATIONS

"Araldite FST 40002/40003 FST Composite System for Aerospace Interior," Huntsman Advanced Materials Flyer, 2014, pp. 1-2.
(Continued)

*Primary Examiner* — Nathan M Nutter
(74) *Attorney, Agent, or Firm* — Dorsey & Whitney LLP

(57) ABSTRACT

Embodiments described herein relate to a composite structures or sandwiches that may have a relatively high bending stiffness and may have a relatively light weight as well as related methods of use and fabrication of the composite sandwiches. For example, a composite sandwich may include a core structure sandwiched between a two composite skins.

18 Claims, 16 Drawing Sheets

(51) Int. Cl.
| | |
|---|---|
| *B32B 37/14* | (2006.01) |
| *B29C 44/12* | (2006.01) |
| *C08G 18/00* | (2006.01) |
| *B29C 70/02* | (2006.01) |
| *B29C 70/34* | (2006.01) |
| *B32B 3/12* | (2006.01) |
| *B32B 27/36* | (2006.01) |
| *B29C 43/20* | (2006.01) |
| *B29C 43/34* | (2006.01) |
| *B29C 43/56* | (2006.01) |
| *B32B 3/20* | (2006.01) |
| *B32B 5/02* | (2006.01) |
| *B32B 5/18* | (2006.01) |
| *B29B 7/88* | (2006.01) |
| *B29B 13/02* | (2006.01) |
| *B29C 70/30* | (2006.01) |
| *B32B 27/10* | (2006.01) |
| *B32B 27/20* | (2006.01) |
| *B32B 27/38* | (2006.01) |
| *B32B 27/40* | (2006.01) |
| *B32B 5/24* | (2006.01) |
| *B32B 27/06* | (2006.01) |
| *B29C 67/20* | (2006.01) |
| *B29K 105/04* | (2006.01) |
| *B32B 38/00* | (2006.01) |
| *B29K 69/00* | (2006.01) |
| *B29K 105/08* | (2006.01) |
| *B29L 31/30* | (2006.01) |
| *B29K 105/00* | (2006.01) |
| *B29K 63/00* | (2006.01) |
| *B29K 75/00* | (2006.01) |
| *B29K 105/16* | (2006.01) |
| *B29K 307/04* | (2006.01) |
| *B29K 509/00* | (2006.01) |
| *B29L 9/00* | (2006.01) |

(52) U.S. Cl.
CPC ....... *B29L 2009/00* (2013.01); *B29L 2031/30* (2013.01); *B32B 2038/0024* (2013.01); *B32B 2305/022* (2013.01); *B32B 2305/076* (2013.01); *B32B 2605/00* (2013.01)

(56) References Cited

U.S. PATENT DOCUMENTS

| | | | |
|---|---|---|---|
| 3,303,733 A | 2/1967 | Sheffield et al. | |
| 3,314,582 A | 4/1967 | Haigler | |
| 3,484,398 A | 12/1969 | Childs | |
| 3,906,137 A | 9/1975 | Bauer | |
| 4,543,289 A | 9/1985 | Park | |
| 4,687,691 A | 8/1987 | Kay et al. | |
| 4,940,563 A | 7/1990 | Kromrey | |
| 4,983,247 A | 1/1991 | Kim | |
| 5,034,256 A | 7/1991 | Santiso, III et al. | |
| 5,484,500 A | 1/1996 | Kaufmann et al. | |
| 5,540,870 A | 7/1996 | Quigley | |
| 5,645,926 A | 7/1997 | Horrocks et al. | |
| 5,683,782 A | 11/1997 | Duchene et al. | |
| 5,716,697 A | 2/1998 | Meeker | |
| 5,756,182 A | 5/1998 | Landi et al. | |
| 5,979,531 A | 11/1999 | Barr et al. | |
| 6,038,949 A | 3/2000 | Jander | |
| 6,139,942 A | 10/2000 | Hartness et al. | |
| 6,197,146 B1 | 3/2001 | Sucic et al. | |
| 8,028,736 B2 | 10/2011 | Jander | |
| 8,334,055 B2 | 12/2012 | Le Gall et al. | |
| 8,556,358 B2 | 10/2013 | Fitzgerald et al. | |
| RE44,893 E | 5/2014 | Raghavendran et al. | |
| 8,777,136 B2 | 7/2014 | Jander | |
| 2002/0010973 A1 | 1/2002 | Dumlao et al. | |
| 2002/0045696 A1 | 4/2002 | Sullivan et al. | |
| 2002/0106503 A1 | 8/2002 | Monk et al. | |
| 2002/0176979 A1 | 11/2002 | Evans | |
| 2003/0098520 A1 | 5/2003 | Cournoyer et al. | |
| 2003/0130411 A1 | 7/2003 | Ishikawa et al. | |
| 2003/0175455 A1 | 7/2003 | Erb et al. | |
| 2004/0028877 A1* | 2/2004 | Itoh et al. ............... B29C 73/04 428/118 |
| 2006/0048311 A1 | 3/2006 | Lee | |
| 2006/0065152 A1 | 3/2006 | Heitmeyer et al. | |
| 2006/0251902 A1 | 11/2006 | Botrie et al. | |
| 2007/0125042 A1 | 6/2007 | Hughes et al. | |
| 2007/0256379 A1 | 11/2007 | Edwards | |
| 2008/0223857 A1 | 9/2008 | Palley et al. | |
| 2009/0227162 A1 | 9/2009 | Kruckenberg et al. | |
| 2010/0021718 A1 | 1/2010 | Vos et al. | |
| 2010/0255283 A1 | 10/2010 | Monk et al. | |
| 2010/0261000 A1 | 10/2010 | Jones | |
| 2011/0089183 A1 | 4/2011 | Gundelsheimer | |
| 2011/0143087 A1 | 6/2011 | Alberding et al. | |
| 2011/0180959 A1 | 7/2011 | Donnelly et al. | |
| 2011/0272509 A1 | 11/2011 | Jander | |
| 2012/0098300 A1 | 4/2012 | Murray | |
| 2012/0141765 A1 | 6/2012 | Katahira et al. | |
| 2012/0177874 A1 | 7/2012 | Brandon et al. | |
| 2012/0204741 A1 | 8/2012 | Bremmer et al. | |
| 2013/0101822 A1 | 4/2013 | Kunal et al. | |
| 2013/0171381 A1 | 7/2013 | Grove-Nielsen | |
| 2013/0203878 A1 | 8/2013 | Igualada et al. | |
| 2013/0224410 A1 | 8/2013 | Nozawa | |
| 2013/0273308 A1 | 10/2013 | Day et al. | |
| 2013/0284003 A1 | 10/2013 | Dodworth | |
| 2013/0292076 A1 | 11/2013 | Raghavendran et al. | |
| 2013/0323429 A1 | 12/2013 | Strobel et al. | |
| 2014/0011016 A1 | 1/2014 | Vanimisetti et al. | |
| 2014/0145470 A1 | 5/2014 | Preisler et al. | |
| 2015/0166743 A1 | 6/2015 | Restuccia et al. | |
| 2017/0057823 A1 | 3/2017 | Hart et al. | |
| 2017/0095997 A1* | 4/2017 | Dodworth ............... B29C 43/56 |
| 2017/0218141 A1 | 8/2017 | Nosker et al. | |
| 2017/0283571 A1 | 10/2017 | Taketa et al. | |

FOREIGN PATENT DOCUMENTS

| | | |
|---|---|---|
| CN | 201755923 U | 3/2011 |
| CN | 102227521 A | 10/2011 |
| CN | 102271888 A | 12/2011 |
| CN | 102548741 A | 7/2012 |
| CN | 203077713 U | 7/2013 |
| CN | 104254439 A | 12/2014 |
| DE | 102013225730 A1 | 6/2015 |
| EP | 0352993 A1 | 1/1990 |
| EP | 0478033 A1 | 4/1992 |
| EP | 0605235 A2 | 7/1994 |
| EP | 0628406 A2 | 12/1994 |
| EP | 0794051 A1 | 9/1997 |
| EP | 0798107 A2 | 10/1997 |
| EP | 1789250 B1 * | 5/2016 |
| FR | 2890893 A1 | 3/2007 |
| GB | 2101930 A | 1/1983 |
| GB | 2300380 A | 11/1996 |
| JP | Y1965027900 | 9/1965 |
| JP | 51041764 A | 4/1976 |
| JP | S5334866 Y2 | 8/1978 |
| JP | S55-049251 A | 4/1980 |
| JP | S57113695 U | 7/1982 |
| JP | 01320145 A | 12/1989 |
| JP | 02088227 A | 3/1990 |
| JP | H03-099812 A | 4/1991 |
| JP | H03109145 A | 5/1991 |
| JP | H05132540 A | 5/1993 |
| JP | H06270304 A | 9/1994 |
| JP | 06344477 A | 12/1994 |
| JP | 07047626 A | 2/1995 |
| JP | H0718081 U | 3/1995 |
| JP | 07125118 A | 5/1995 |
| JP | H07180281 A | 7/1995 |
| JP | H07256803 A | 10/1995 |

(56) References Cited

FOREIGN PATENT DOCUMENTS

| | | |
|---|---|---|
| JP | 08258189 A | 10/1996 |
| JP | H08258189 A | 10/1996 |
| JP | H11-25453 | 1/1999 |
| JP | 11207843 A | 8/1999 |
| JP | 11247356 A | 9/1999 |
| JP | H11254563 A | 9/1999 |
| JP | 2000006145 A | 1/2000 |
| JP | 2000043171 A | 2/2000 |
| JP | 2001031838 A | 2/2001 |
| JP | 2003025360 A | 1/2003 |
| JP | 2004017355 A | 1/2004 |
| JP | 2006188688 A | 7/2006 |
| JP | 2007331369 A | 12/2007 |
| JP | 2008230235 A | 10/2008 |
| JP | 2008238566 A | 10/2008 |
| JP | 2010149260 A | 7/2010 |
| JP | 2013001006 A | 1/2013 |
| JP | 2013032510 A | 2/2013 |
| JP | 2014533751 A | 12/2014 |
| WO | 90/00968 | 2/1990 |
| WO | 92/10362 | 6/1992 |
| WO | 92/12855 A | 8/1992 |
| WO | 2003101719 A2 | 12/2003 |
| WO | 2009011304 A1 | 1/2009 |
| WO | 2009157295 A1 | 12/2009 |
| WO | 2013178755 A1 | 12/2013 |
| WO | 2014130751 A1 | 8/2014 |
| WO | 2016178755 A1 | 11/2016 |
| WO | 2017120025 A1 | 7/2017 |

OTHER PUBLICATIONS

"Araldite FST 40004/40005 FST Composite System for Railway," Huntsman Advanced Materials Flyer, 2016, pp. 1-2.
"Araldite, Solutions or Automotive Mass Production," Huntsman Advanced Materials Flyer, 2014, pp. 1-2.
"Tough Sandwich Design Lightens Load Floor in Crossover SUV," Composites Technology, Jun. 1, 2008, Retrieved Nov. 22, 2016.
Bosch, Marcos Ramos, "New Sandwich Composites: For Lightweight Construction in the Automotive Industry," JEC Magazine #45, Nov.-Dec. 2008, Retrieved Nov. 22, 2016.
CompositesWorld, "High-tensile strength, high-modulus carbon fiber" Mar. 10, 2014 [online] [retrieved on Oct. 1, 2015). Retrieved from the Internet <URL: http://www.compositesworld.com/products/high-tensile-strength-high-modulus-carbon-fiber>.
International Search Report and Written Opinion from International Application No. PCT/US2015/034051 dated Nov. 3, 2015.
International Search Report and Written Opinion from International Application No. PCT/US2015/034061 dated Aug. 19, 2015.
International Search Report and Written Opinion from International Application No. PCT/US2015/034072 dated Nov. 2, 2015.
International Search Report and Written Opinion from International Application No. PCT/US2015/034070 dated Feb. 1, 2016.
Non-Final Office Action for U.S. Appl. No. 15/311,344 dated Jan. 11, 2018.
Restriction Requirement for U.S. Appl. No. 15/311,344 dated Oct. 20, 2017.
Non-Final Office Action for U.S. Appl. No. 15/311,271 dated Nov. 19, 2018.
Notice of Allowance for U.S. Appl. No. 15/311,344 dated Jan. 15, 2019.
Notice of Allowance for U.S. Appl. No. 15/311,344 dated Jun. 20, 2018.
Notice of Allowance for U.S. Appl. No. 15/311,344 dated Sep. 28, 2018.
Restriction Requirement for U.S. Appl. No. 15/311,271 dated Aug. 28, 2018.
Restriction Requirement for U.S. Appl. No. 15/311,606 dated Jun. 7, 2018.
Non-Final Office Action for U.S. Appl. No. 15/311,606 dated May 9, 2019.
Notice of Allowance for U.S Appl. No. 15/311,271 dated May 1, 2019.
Notice of Allowance for U.S. Appl. No. 15/311,344 dated Apr. 25, 2019.
Notice of Allowance for U.S. Appl. No. 15/311,606 dated Jan. 23, 2019.
Restriction Requirement for U.S. Appl. No. 15/560,831 dated Apr. 2, 2019.
Issue Notification for U.S. Appl. No. 15/311,271 dated Aug. 21, 2019.
Issue Notification for U.S. Appl. No. 15/311,344 dated Aug. 14, 2019.
Non-Final Office Action for U.S. Appl. No. 15/560,831 dated Aug. 29, 2019.
U.S. Appl. No. 16/537,051 filed Aug. 9, 2019.
Notice of Allowance for U.S. Appl. No. 15/311,606 dated Sep. 30, 2019.
Advisory Action for U.S. Appl. No. 15/560,831 dated Apr. 6, 2020.
Final Office Action for U.S. Appl. No. 15/560,831 dated Feb. 4, 2020.
International Search Report and Written Opinion from International Application No. PCT/US2019/062138 dated Mar. 19, 2020.
International Search Report and Written Opinion from International Application No. PCT/US2019/062139 dated Mar. 19, 2020.
Notice of Allowance for U.S. Appl. No. 15/311,606 dated Jan. 29, 2020.
Non-Final Office Action for U.S. Appl. No. 15/560,831 dated May. 29, 2020.
Notice of Allowance for U.S. Appl. No. 15/311,606 dated May 11, 2020.

* cited by examiner

SOLID

CORE THICKNESS t

CORE THICKNESS 3t

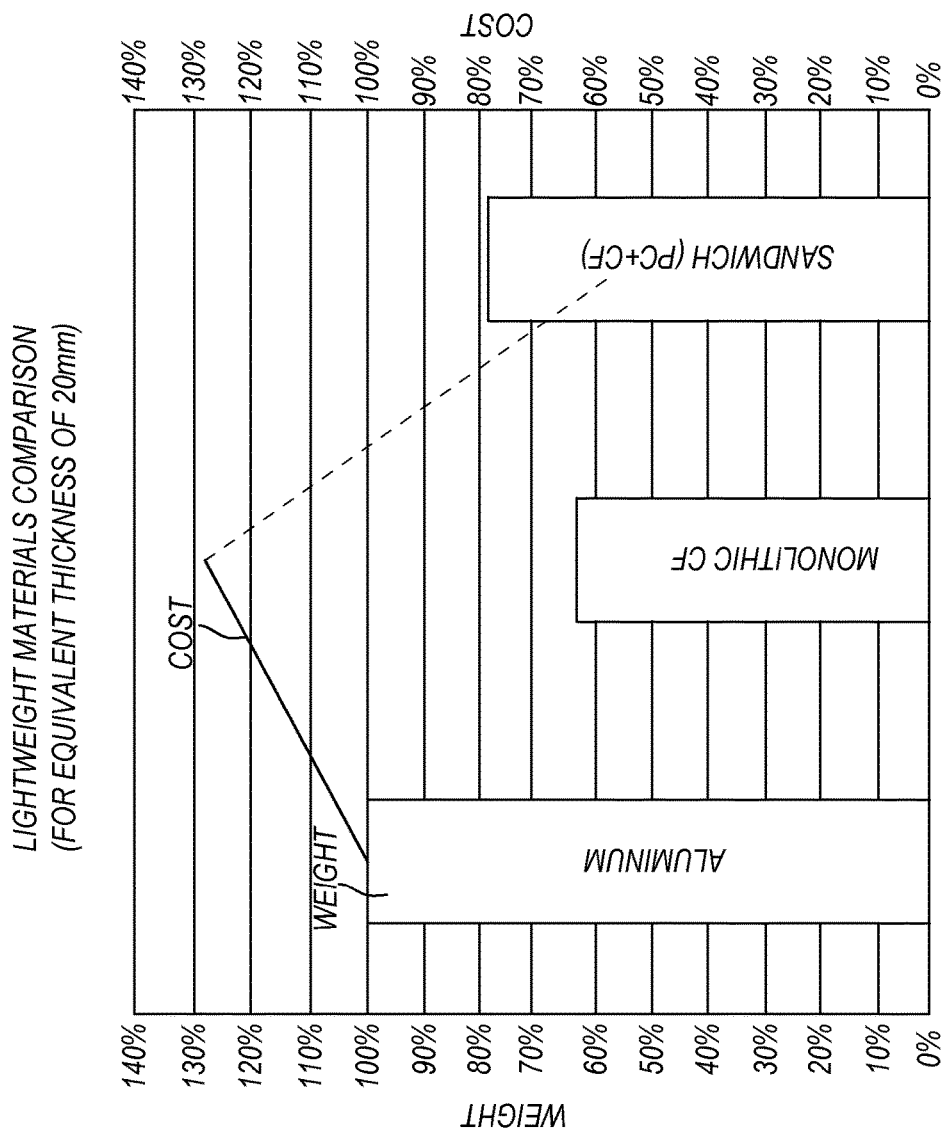

COMPOSITE SANDWICH HAVING A HIGH BENDING STIFFNESS

CROSS-REFERENCE TO RELATED APPLICATIONS

This application claims priority to U.S. Provisional Application No. 62/007,614 filed on 4 Jun. 2014, the disclosure of which is incorporated herein, in its entirety, by this reference.

This application claims priority to U.S. Provisional Application No. 62/007,632 filed on 4 Jun. 2014, the disclosure of which is incorporated herein, in its entirety, by this reference.

This application claims priority to U.S. Provisional Application No. 62/007,652 filed on 4 Jun. 2014, the disclosure of which is incorporated herein, in its entirety, by this reference.

This application claims priority to U.S. Provisional Application No. 62/007,670 filed on 4 Jun. 2014, the disclosure of which is incorporated herein, in its entirety, by this reference.

This application claims priority to U.S. Provisional Application No. 62/007,685 filed on 4 Jun. 2014, the disclosure of which is incorporated herein, in its entirety, by this reference.

This application claims priority to U.S. Provisional Application No. 62/108,837 filed on 28 Jan. 2015, the disclosure of which is incorporated herein, in its entirety, by this reference.

BACKGROUND

Composite structures may be used in any number of suitable applications. Generally, composite structure also may be used in various applications where reducing weight to strength ratio is important. For example, composite structures may be used in vehicle chassis, panels for communication equipment, frames or body parts for transportation or vehicles (e.g., bicycles, motor cycles, trucks etc.), agricultural applications (e.g., agricultural equipment), energy related applications (e.g., wind power, solar), satellite applications, aerospace applications, construction materials (e.g., building materials and the like), and consumer products (e.g., furniture, toilet seats, and electronic products among others).

Accordingly, manufacturers and users of composite structures continue to seek improvements thereto.

SUMMARY

Embodiments described herein relate to composite structures (e.g., composite sandwiches) that may have a relatively high bending stiffness and may be relatively light weight as well as related methods of use and fabrication of such composite structures. For example, a composite sandwich may include a core structure sandwiched between at least two composite skins. In some embodiments, at least one of the at least two composite skins may include a polymer matrix (e.g., a solidified or cured polymer resin) and reinforcement fibers embedded in the polymer matrix. Furthermore, after curing and solidifying, the polymer resin may form a suitably strong bond with the core. In at least one embodiment, when solidified, the polymer resin provides structural rigidity and/or support for the composite sandwich.

An embodiment includes a composite sandwich. More specifically, the composite sandwich includes a first composite skin including a plurality of reinforcement fibers embedded in a polymer matrix and a second composite skin including a plurality of reinforcement fibers embedded in a polymer matrix. The composite sandwich also includes a core positioned between the first and second composite skins and bonded thereto. The core includes a plurality of cells defined by corresponding cell walls. For example, the core may include a polymer core.

Embodiments also include a method of fabricating a composite sandwich. The method includes assembling a stack assembly that includes a first fiber sheet impregnated with a polymer resin, a second fiber sheet impregnated with a polymer resin, and a core blank positioned between the first and second fiber sheets. The method also includes heating and applying pressure to the stack assembly to bond the first and second fiber sheets to the polymer core blank to form the composite sandwich.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

For better understanding, the like elements have been designated by like reference numbers throughout the various accompanying figures. Understanding that these drawings depict only typical embodiments of the invention and are not therefore to be considered to be limiting of its scope, the embodiments of the invention will be described and explained with additional specificity and detail through the use of the accompanying drawings in which:

FIG. 22A is graph illustrating material comparison by weight and cost for plates of equivalent thickness;

DETAILED DESCRIPTION

Figure 1A:
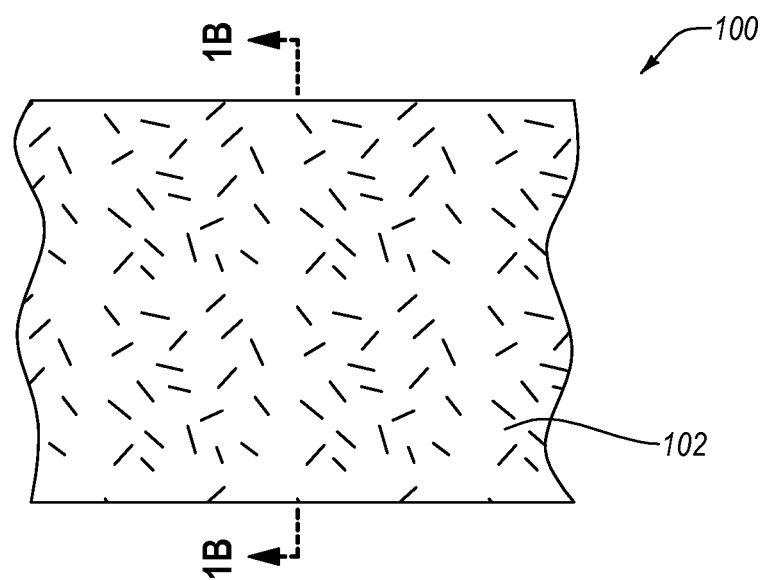
FIG. 1A is a partial top view of a composite sandwich according to an embodiment.

Embodiments described herein relate to composite structures (e.g., composite sandwiches) that may have a relatively high bending stiffness and may be relatively light weight as well as related methods of use and fabrication of the composite structures. For example, a composite sandwich may include a core structure sandwiched between at least two composite skins. In some embodiments, at least one of the at least two composite skins may include a polymer matrix (e.g., a solidified or cured polymer resin) and reinforcement fibers embedded in the polymer matrix. Generally, a cured or solidified polymer resin may be substantially completely cured or solidified or partially cured or solidified (e.g., such that the polymer resin remains at least partially viscous). Furthermore, after curing and solidifying, the polymer resin may form suitably strong bond with the core. In at least one embodiment, when solidified, the polymer resin provides structural rigidity and/or support for the composite sandwich.

Generally, the composite sandwich may be used as or may form any number of suitable components or elements in any number of devices and/or structures. For example, the composite sandwich may be used as a component in a vehicle, such as an automobile (e.g., a structural or frame component, a panel, etc.). In some embodiments, the composite sandwich may be used in furniture, flooring, etc. In any event, the composite sandwich may be used as a structural and/or non-structural component in various applications.

In one or more embodiments, a core blank may be at least partially compressed during fabrication to form the core of the composite sandwich. For example, a core blank may be positioned between fiber sheets impregnated with polymer resin, which may be heated and/or compressed together to form a composite sandwich. In particular, the fiber sheets together with polymer resin may form the composite skins of the composite sandwich, which are bonded to the core (formed from the core blank). In some embodiments, the core blank may be compressed to different heights or thicknesses to form a core that has correspondingly varied thicknesses at different portions thereof. Hence, in some embodiments, different portions of the composite sandwich may have different thicknesses (e.g., the composite sandwich may have a three-dimensional configuration). Moreover, the composite sandwich may be generally formed as a panel that may have planar and/or nonplanar surfaces.

The core material and configuration may vary from one embodiment to the next. Generally, a relatively hard core may effectively transfer the full load from one end of the core to the other end of the core. For example, the "hard" core may be formed from a core blank that includes plastic material (e.g., thermoplastic, thermoset, etc.) and may include multiple cells defined by corresponding one or more cell walls (e.g., the plastic material may define a honeycomb-like structure, where the cells may have any number of suitable shapes). In some embodiments, plastic tubes (e.g., straws, such as drinking straws, which may include low cost material, and may be relatively light-weight) may be combined together to collectively form the core blank (e.g., each straw may define a corresponding cell of the core and adjacent cores may define additional cell in the gaps or spaces therebetween). Additionally or alternatively, high density foams and other suitable and/or compressible materials may be included in the core blank (e.g., material that may be porous or may include small or micro pores or cells, which may have three-dimensional arrangement within the material).

In additional or alternative embodiments, one or more portions of the core may also be relative soft, and may include or may be constructed of relatively soft materials, such as paperboards or cardboards or low density foams. The "soft" core may not transfer a full load from one end of the core to the opposite end of the core when a load is applied onto an end of the core, for example, the "soft" core may be formed from paperboards, or cardboards and the like. In some embodiments, the full load means at least 70% of the load applied. In some embodiments, the full load means at least 80% of the load applied. In some embodiments, the full load means at least 90% of the load applied. In some embodiments, the full load means 100% of the load applied. The "soft" core may absorb more energy or impact than the "hard" core in a vertical direction substantially perpendicular to the composite skins.

As described above, the configuration and/or composition of the composite skins (e.g., the composition of the polymer matrix and/or reinforcement fiber) may vary from one embodiment to the next. Generally, the fibers may be continuous (e.g., fibers that may extend between edges of the skin) and/or discontinuous or short fibers, which may be randomly oriented. In some embodiments, the discontinuous fibers may be recycled fibers from waste fibers, such as from the RTM to significantly reduce the material cost. Also, the fibers may include any number of suitable materials (e.g., the fibers may be carbon fibers, glass fibers, etc.).

Moreover, the fibers (continuous and/or discontinuous) may be arranged together to define a fiber sheet. In some embodiments, the fibers in the fiber sheet may be overplayed and/or weaved together. Alternatively, the fibers may be loosely positioned together and/or matted together to define the fiber sheet. In an embodiment, loosely positioned fibers may be attached or bonded together to form the fiber sheet.

In some embodiments, the composite sandwiches described herein may have a relatively high bending stiffness and relatively good energy absorption along the composite sandwich (e.g., when the composite sandwich includes a relatively hard core). For example, composite sandwiches with high bending stiffness and/or good energy absorption may be used for fabricating or may be fabricated as any number of suitable components (e.g., structural components of a vehicle, such as a chassis). As described above, the components fabricated from composite sandwich(es) may have two- and/or three-dimensional configurations. As used herein, the term "two-dimensional" composite sandwich refers to a composite sandwich that has generally flat or planar opposing outer surfaces and a generally uniform thickness. By contrast, as used herein, the term "three-dimensional" composite sandwich refers to a composite sandwich that has one or more non-planar outer surfaces and/or non-uniform thickness.

In an embodiment, the composite sandwich may include a polymer surface that may be substantially free of surface defects. For example, the low pressure compression molding process described herein may produce a polymer surface substantially free of pin holes (e.g., an outer surface of one or more of the skin layers of composite sandwich may be free of defects, such as pin holes). In some embodiments, a surface that is substantially free of defects may be easier and/or cheaper to paint (e.g., as compared to a surface with defects). Typically, RTM process may require application of high pressure, such as 120 bars (about 1764 psi), to reduce the sizes of pin holes on a finished composite surface, which may persist even when the processing is performed at high pressure. In some instances, the high pressure RTM process may be more expensive than low pressure compression molding and/or may have a lower yield than the low pressure compression molding process.

Figure 1B:
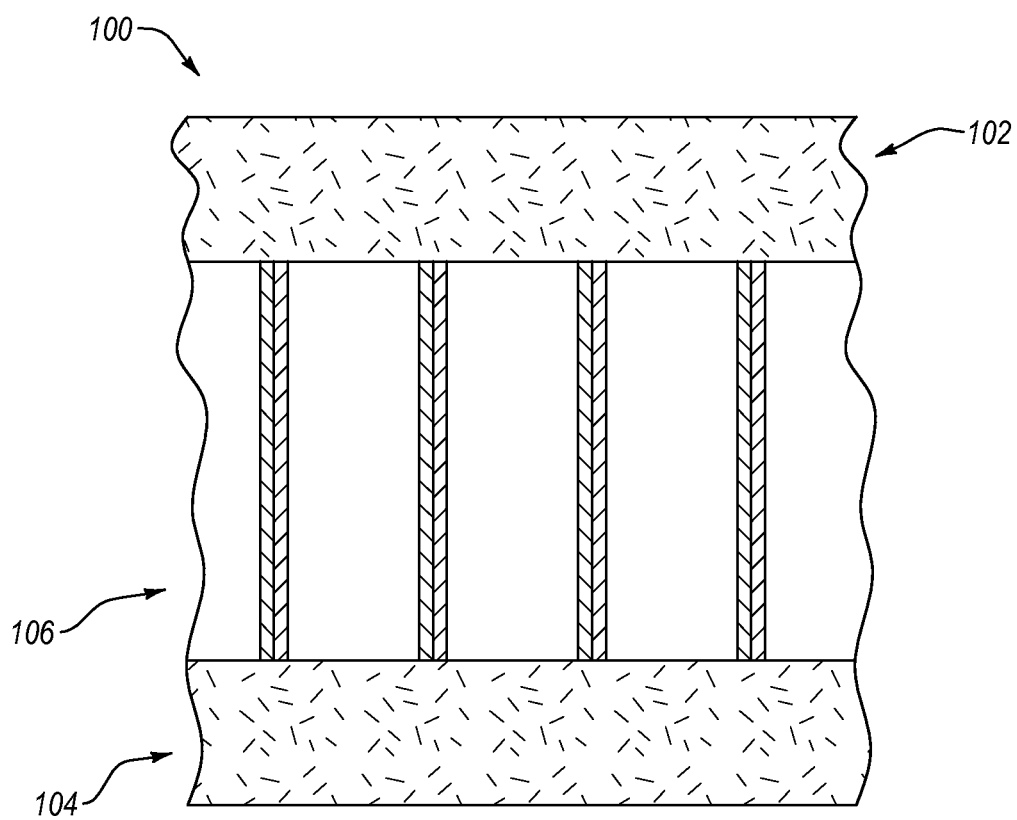
FIG. 1B is a partial cross-sectional view of the composite sandwich of FIG. 1A.

FIGS. 1A and 1B illustrates respective schematic top and cross-sectional views of a composite sandwich 100 according to an embodiment. In the illustrated embodiment, the composite sandwich 100 includes a top composite skin 102, a bottom composite skin 104, and a core 106 sandwiched between the top composite skin 102 and the bottom composite skin 104. Generally, the terms "top" and "bottom" are used in connection with the composite skin for ease of description and are not intended to denote a particular orientation of the composite skin or of the composite sandwich.

As described above, the top and/or bottom composite skins 102, 104 may include or may be formed from a composite (e.g., may include fibers embedded in a cured resin). In some embodiments, the composite sandwich 100 may be relatively light-weight and/or may have relatively thin top and/or bottom composite skins 102, 104. Moreover, in some embodiments, a relatively thin composite skin may require less time to cure than, for example, a bulk solid composite that has the same or similar volume as the composite sandwich.

FIG. 1A illustrates schematic view of the top composite skin 102, which shows the fibers of the fiber sheet that is embedded in the polymer resin. Generally, fiber sheet(s) may be impregnated with polymer resin and pressed against a core blank to form the corresponding top and bottom composite skins 102, 104 compressed against and/or bonded to the core 106 of the composite sandwich 100, shown in FIG. 1B. For example, the impregnated fiber sheets that may form the top and bottom composite skins 102, 104 may be at least partially uncured when pressed against the core blank that may form the core 106, such that after curing and solidifying, the top and bottom composite skins 102, 104 are bonded to the core 106, thereby forming the composite sandwich 100.

Moreover, as described below in more detail, in some embodiments, the core blank may be at least partially compressible. For example, the core blank may include a compressible material (e.g., compressible foam) and/or may include one or more compressible members or cells (e.g., members that may be bent (such as by plastic or elastic deformation) and/or melted to compress). In some embodiments, the compressible cells of the core blank may be formed or defined by tubes or straws. Alternatively, the cells may be formed from a sheet material (e.g., each cell may be defined by a single wall). In an embodiment, the core blank may be extruded and the cells may have any suitable shape (e.g., an extrusion die may be configured to produce any number of shapes).

In any event, the cells may have any number of suitable shapes and sizes, which may vary from one embodiment to the next. In one or more embodiments, the cells may be generally cylindrical (e.g., one, some, or each of the cells may include a generally cylindrical wall defining an open space or cavity of the cell). It should be appreciated that the core 106 that includes cylindrical cells may exhibit similar load bearing properties any number of directions along the composite sandwich 100.

The composite sandwich 100 that includes the core 106 with cells that have one or more polygonal shapes, such as triangular, square, pentagonal, hexagonal, octagonal, etc., may have different load bearing properties along different directions (e.g., depending on the orientation of the cells of the core 106 relative to the direction of the load). In any case, during fabrication of the composite sandwich 100, the core blank may be at least partially compressed to form the core 106. Alternatively or additionally, at least a portion of the core blank may remain substantially or at least partially uncompressed after fabrication of the composite sandwich 100 (e.g., the height or thickness of the core blank may be similar to or the same as the height or thickness of the core 106 formed therefrom). In some embodiments, the core blank may be fully compressed to form a substantially solid core. It should be appreciated that the core 106 that is formed from substantially uncompressed or partially compressed core blank may include cells with voids or cavities therein.

In at least one embodiment, a core blank (that may form the core 106) may include one or more bundles of tubular members, such as plastic tubes or straws. For example, at least some of the tubes may be attached or bonded to one another, such as thermally bonded (e.g., to adjacent tubes). Alternatively, the tubes may be loosely placed together. Generally, any number of suitable tubular members may be used to assemble the core blank that includes one or more tubes and/or one or more bundles of tube (e.g., polycarbonate tube, polyethylene tubes, etc., which may provide high bending stiffness for the composite sandwich 100 at relatively low cost). In an embodiment, one, some, or each of the tubes may have two opposing open ends. Alternatively, one, some, or each of the tubes may have one or more closed ends.

In an embodiment, the core 106 that is formed from multiple tubes may form a "hard" core, which may effectively transfer load from one end of thereof to the other. The core 106 that includes tubular members or tubes, such as drinking straws, may absorb relatively little impact energy in a vertical direction or generally perpendicular to the top and/or bottom composite skins 102, 104, but may have relatively good energy absorption in a horizontal direction, such as along the top and/or bottom composite skins 102, 104. Alternatively, as relatively "soft" core may include materials and/or may have a configuration such as to form a softer core, as described in more detail in PCT International Application No. PCT/US2015/034072, entitled "Composite Sandwich Exhibiting Energy Absorption And/Or Including A Defect Free Surface" and is filed concurrently herewith, which claims priority to U.S. Provisional Application No. 62/007,670 filed on 4 Jun. 2014, U.S. Provisional Application No. 62/007,652 filed on 4 Jun. 2014, and U.S. Provisional Application No. 62/108,837 filed on 28 Jan. 2015, the disclosure of each of the foregoing applications is incorporated herein in its entirety by this reference.

Generally, the core blank (and the core 106 formed therefrom) may be formed from any number of suitable materials, which may vary from one embodiment to the next. Moreover, the core blank material may vary from one portion of the core blank (and the core 106 formed therefrom) to another. In some embodiments, tubes or tubular members of the core 106 may be formed from polycarbonate (e.g., similar to or the same as drinking straws), polyethylene, or any suitable thermoplastic or thermoset material. For example, the core blank used to form the core 106 may have a density of 70 kg/m$^3$ and a thickness or cell height of 7 mm. As described herein, however, it should be appreciated that the cell height or thickness of the core blank and the core 106 formed therefrom may vary from one embodiment to the next (e.g., the core blank thickness may be between 3 mm and 30 mm).

As described above, the top and/or bottom composite skins 102, 104 may include carbon fibers embedded in a polymer matrix (e.g., in a cured polymer resin). The polymer resin may be provided in a liquid form and may cure to solidify with the fibers embedded therein. In an embodiment, the liquid polymer resin may include a mixture of a thermoset and a thermoplastic, such as a mixture of epoxy and polyurethane. For example, after curing or solidifying, the polymer resin may form the polymer matrix that includes a mixture of cured epoxy and polyurethane micro-foams or porous polyurethane (e.g., the micro-foams may be microporous foams). It should be appreciated, however, that the epoxy or polyurethane foam may have pores of any number of suitable sizes and/or shapes.

Generally, after curing or solidifying, the polymer resin can transfer load between fibers. In some embodiments, one thermoset polymer may have a better load transfer capability than another thermoset polymer. For example, an epoxy may be harder than polyurethane and, thus, may transfer load more effectively among fibers. Moreover, polymer resin matrix that is formed from a mixture of polymers (e.g., a mixture of thermosets, such as epoxy and polyurethane) and/or optionally a thermoplastic (e.g., comingled thermoplastic fibers) may have improved mechanical performances as compare to a single thermoset polymer matrix.

In some embodiments, a mixture of two thermosets may be preferable over a single thermoset. Moreover, foam may increase the surface area which may facilitate bonding the top and/or bottom composite skin 104, 106 to the core 106. In some configurations, one thermoset (e.g., epoxy) may provide better load transfer capability than another thermoset (e.g., polyurethane). For example, the top and/or bottom composite skins 102, 104 may be formed from one or more thermosets (e.g., a mixture of epoxy and polyurethane or only polyurethane) and optionally a thermoplastic (e.g., comingled thermoplastic fibers), which may improve mechanical performance thereof (e.g., as compared with a composite skin that includes a single thermoset or thermoplastic material). In some embodiments, the thermoplastic may improve the toughness of the top and/or bottom composite skins 102, 104 (e.g., as compared to composite skins without thermoplastic materials). Various materials, configurations, and methods of fabricating the composite skins are described in more detail in PCT International Patent Application No. PCT/US2015/034051, entitled "Multicomponent Polymer Resin, Methods for Applying the Same, and Composite Laminate Structure Including the Same" and filed concurrently herewith, which claims priority to U.S. Patent Application No. 62/007,632 filed on 4 Jun. 4, 2014 and U.S. Patent Application No. 62/108,837 filed on 28 Jan. 2015, the disclosure of each of which is incorporated herein, in its entirety, by this reference.

In some configurations, the polymer resin including a mixture of epoxy and polyurethane may bond well with and/or to the core 106 (e.g., to plastic tubes) and may resist peeling off the core 106 more than epoxy alone (e.g., may withstand higher peel-off forces). The foam (e.g., polyurethane foams) may form during curing and may facilitate attachment of the top and/or bottom composite skins 102, 104 to the core 106. For example, the foams may partially or completely fill cavities in the core 106 and attach to the core 106 via primarily a mechanical bond rather than a chemical bond. In some configurations, a conventional epoxy in the composite skin may not adhere to the "hard" core (e.g., the composite skins were found by the inventor to relatively easily peel off the ends of the "hard" core).

In an embodiment, the polymer resin may be different from the polyurethane, such as VITROX used in the Bayer Preg. For example, the polyurethane foam may have water permeation through the foam and may be much softer than the epoxy. The polymer resin including a mixture of epoxy and polyurethane may provide a hard surface for the composite sandwich and/or may be more water resistant than surface formed from polyurethane.

In one or more embodiments, the top and/or bottom composite skins 102, 104 may include about 50% by weight of carbon fibers and about 50% by weight of the polymer matrix. It will be appreciated that, however, the weight content of the fibers and/or the percentage by weight of fibers and polymer matrix may vary from one embodiment to the next. In some embodiments, reinforced carbon fiber (RCF) may be about 200 g/m$^2$ in weight, which may produce composite skins of about 0.2 mm when a polymer resin that embeds the fibers is cured. For example, Toray T700 60E carbon fiber may be cut from a dry NCF waste to a 35 mm fiber, and then may be used to form a random fiber mat with an areal density of 200 g/m$^2$.

The NCF may have a mass or weight of 300 g/m$^2$ to further strengthen the composite. To increase the thickness of the composite skin, multiple fiber sheets and/or multiple layers of fibers may be embedded in the polymer matrix. For example, including two layers of fibers in a composite skin may produce a thickness of 0.4 mm; three layers of fibers may produce a thickness of 0.6 mm, and so on. When the number of fiber sheets increases, the composite skin becomes thicker and thus stronger and stiffer than a relatively thinner composite skin.

In some embodiments, the fiber sheet(s) may include a high performance material, such as a non-crimp fabric (NCF), a woven fabric, etc., which may increase resistance of the composite skin to pull out loads and/or tensile strength thereof. The NCF may include two or more plies or layers of unidirectional continuous fibers. Moreover, in some embodiments, each layer may be oriented along a different axis and/or at a different angle relative to another layer (e.g., 0°, 90°, or 45° among any number of other suitable angles). For example, depending on the number of layers and/or orientation(s) of each layer, a unidirectional, bi-axial, tri-axial and quadri-axial configuration may be assembled into a multi-sheet or multi pile stack or assembly.

As described above, the top and bottom composite skins 102, 104 may be bonded to the core 106. For example, one or more portions of the top and bottom composite skins 102, 104 and/or polymer forming the matrix thereof may be positioned inside one or more voids or cavities in the core 106 (e.g., in the cavities defined by the walls of the tubes of the core 106). Moreover, the polymer positioned in the cavities of the core 106 may at least in part bond the corresponding top and/or bottom composite skins 102, 104 to the core 106. In some embodiments, the foam may be substantially hard foam. For example, as described above, a polymer resin or mix of two or more polymers that forms the matrix of the top or bottom composite skins 102, 104 may include or form the foam at and/or near the interface with the core 106. That is, the polymer (e.g., a polyurethane) used to impregnate fiber sheets and fabricate the polymer matrix may foam before, during, and/or after the impregnated fiber sheet is positioned in contact with the core blank during fabrication of the composite sandwich 100b. Hence, in at least one embodiment, the foam may include the same or similar material as the polymer matrix of the top and/or bottom composite skins 102, 104 and/or may have generally the same or similar hardness as the polymer matrix of the top and/or bottom composite skins 102, 104, but may include gas pockets which may be sealed or unsealed (e.g., one or more portions of the foam may be open cell and/or closed cell).

In some embodiments, the foam may be positioned between only one of the composite skins and the core (e.g., between the top composite skin 102 and core 106). As described above, the foam may only partially extend from the composite skin 102 into the cavities of the cells in the core 106. Also, the composite sandwich may include foam extending from the bottom skin 104 and partially into one or more cavities of the cells in the core 106. Moreover, in an embodiment, the foam may extend into the cavities of the cells in the core 106 and between the top and bottom composite skins 102, 104 (e.g., partially or completely filling one or more cavities of the cells in the core 106).

In one or more embodiments, the foam may be positioned in one or more of the cavities in the core 106 and may at least in part bond the top and/or bottom composite skins 102, 104 adjacent to the core 106. Additionally or alternatively, as described above, one or more portions of the core blank may be compressed to form a substantially solid core 106. For example, a substantially solid portion of the core 106 may include foam and thermoplastic material of the core blank compressed together to form a substantially solid material of the solid portion of the core 106. That is, in some embodiments, the substantially solid portion of the core 106 may include gas pockets or pores therein, such micro-pores, (e.g., the foam in the solid portion of the core 106, which includes the gas pockets, may be segmented or divided by solid walls and/or solid barriers formed from melted and/or collapsed cell walls, such as from walls of tubular members). Hence, in some embodiments, the substantially solid portions of the core 106 may include porous polymer resin and substantially non-porous thermoplastic (e.g., polycarbonate, polyethylene, etc.) and/or thermoset material that is mixed together with and/or separates portions of the porous polymer resin.

Again, in some embodiments, the foam may form as a result of mixing two or more polymer resins (e.g., polyurethane and epoxy). The foam may expand into the cavities of the cells in the core 106. For example, as the foam forms at the interface between the top composite skin 102 and the core 106, the foam may expand into the cavities (e.g., while pressure is applied to the impregnated fiber sheets). In an embodiment, the foam may press against walls of the tubular members and, when cured may provide mechanical adhesion between the top composite skin 102 and the core 106 (e.g., the foam may expand or otherwise deform the walls defining the cells of the core 106, such as the walls of the tubular members).

Figure 2:
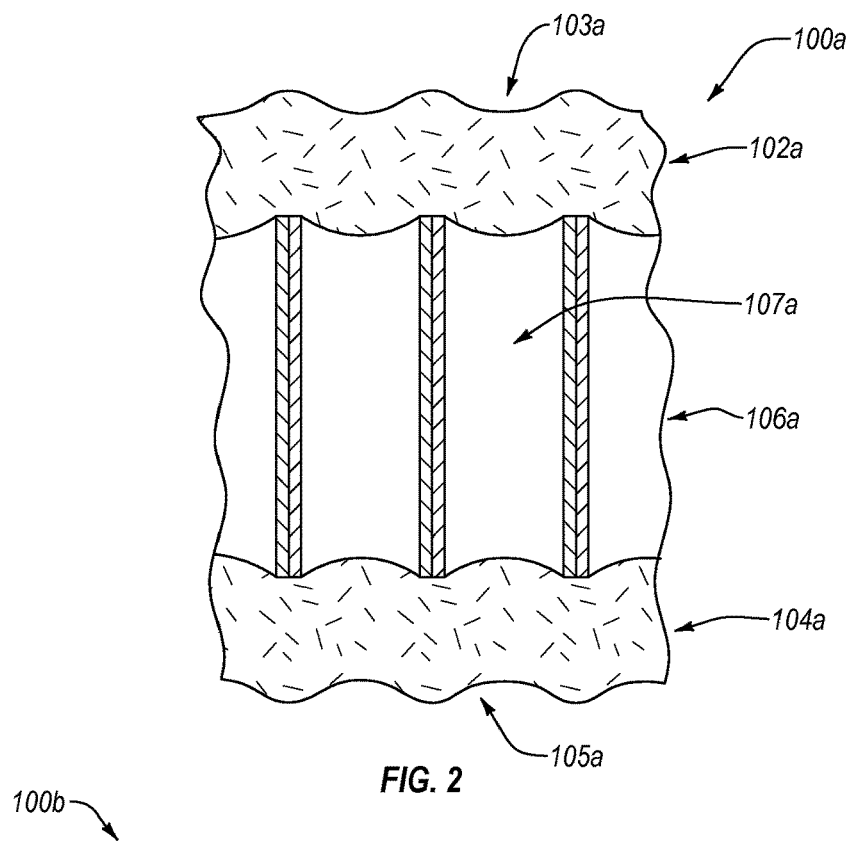
FIG. 2 is a partial cross-sectional view of a composite sandwich according to an embodiment.

FIG. 2 shows a cross-sectional view of a composite sandwich 100a according to an embodiment. Except as otherwise described herein, the composite sandwich 100a and its elements and components may be similar to or the same as the composite sandwich 100 (FIG. 1) and its corresponding elements and components. For example, the composite sandwich 100 may include top and bottom composite skins 102a, 104a bonded to and on opposing sides of core 106a that may be similar to the top and bottom composite skins 102, 104 and core 106 of the composite sandwich 100 (FIGS. 1A-1B).

As described above, the core 106a may include one or more cells each of which may include a corresponding open space or cavity defined by corresponding one or more walls. More specifically, for example, one, some, or each of the cells of the core 106a may be at least in part formed by corresponding tubular member(s) that may include a wall defining corresponding void(s) or cavities of the cells, such as cavities 107a in the illustrated embodiment.

Moreover, in some embodiments, one or more ends of the tubes that form the core 106a may be open before attachment of the top and/or bottom composite skins 102a, 104a. In an embodiment, bonding the top composite skin 102a to the core 106a may press or force a portion of the top composite skin 102a into one, some, or each of the cavities in the cells (such as cavities 107a) of the core 106a. Analogously, bonding the bottom composite skin 104a to the core 106a may press or force a portion of the bottom composite skin 104a into one, some, or each of the cavities in the cells (such as cavities 107a) of the core 106a. Hence, for example, corresponding one or more dimples or print-through depressions may be formed in the exposed or outward surfaces of the top and/or bottom skins 102a, 104a.

In some embodiments, the one or more indentations that may be formed in the outer surfaces of the top and/or bottom composite skins 102a, 104a may have no significant effect on the bending stiffness or other mechanical properties of the composite sandwich 100a. For some applications, however, the aesthetic appearance of the outer surfaces of the top and/or bottom composite skins 102a, 104a that include indentation(s) may be undesirable. Hence, in some embodiments, the top and/or bottom composite skins 102, 104 may be bonded to the core 106 without forming indentations in the outer surfaces thereof (e.g., a sufficiently or suitable thick material may be used to facilitate entry of one or more portions of the top and/or bottom composite skins 102, 104 into the cavities in the cells of the core without forming indentation(s) on the outer surfaces of the top and/or bottom composite skins 102, 104).

In alternative or additional embodiments, the sizes of voids or cavities 107 may be such that prevents or limits entry of the top and/or bottom composite skins 102a, 104a into the cavities 107a, such as to produce outer surfaces of the composite sandwich 100a that are substantially free of dimples or indentations. For example, when applying relatively more pressure on the impregnated fiber sheets during fabrication (e.g., to compress the core blank to a smaller thickness than in other instances), core blank may include tubular members with relatively smaller cavities. Conversely, when applying relatively less pressure on the impregnated fiber sheets during fabrication (e.g., to compress the core blank to a greater thickness than in other instances), core blank may include tubular members with relatively bigger cavities. Moreover, in some embodiments, the core blank (and the corresponding core 106a formed therefrom) may include tubular member of two or more sizes, which may have relatively smaller and relatively bigger cavities.

For example, the tubular members with relatively bigger cavities may be positioned in the portions of the core blank that will be compressed less than the portions that include tubular members with smaller cavities (e.g., to form bends, corners, etc., the core blank may be compressed more than to form a planar or slightly curved portion of the composite sandwich). In some embodiments, tubular members with relatively smaller cavities (e.g., smaller diameter tubular members) may be included in the portion(s) of the blank core that will be subjected to greater compressive force and/or may experience more stress during fabrication of the composite sandwich, such as curved sections of the composite sandwich. Accordingly, for example, by varying the sizes of tubular members (e.g., at least in part based on the amount of compression required to compress the core blank to form the core of the composite sandwich) may facilitate producing a composite sandwich with outer surfaces substantially free of dimples or indentations.

Figure 3:
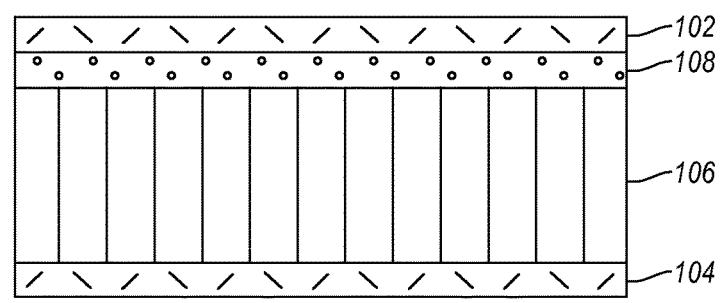
FIG. 3 is a partial cross-sectional view of a composite sandwich according to another embodiment.

FIG. 3 illustrates a schematic side view of a composite sandwich 100b according to an embodiment. Except as otherwise described herein, the composite sandwich 100b and its elements and components may be similar to or the same as any of the composite sandwiches 100, 100a (FIGS. 1-2) and their corresponding elements and components. In at least one embodiment, the composite sandwich may include top and bottom composite skins 102, 104 and a core 106 positioned therebetween and bonded thereto (similar to composite sandwich 100 (FIGS. 1A-1B).

In an embodiment, the composite sandwich 100b may include an intermediate layer, such as a plastic foam layer positioned between at least one of the top composite skin 102 and the core 106 and/or between the bottom composite skin 104 and the core 106. The polymer foam layer 108 may help reduce print-through from the core blank. In the illustrated embodiment, the composite sandwich 100b includes a foam 108 (e.g., a plastic foam) positioned between the top composite skin 102 and the core 106. More specifically, for example, the foam 108 may be bonded to the core 106 on a first side and bonded to or integrated with the top composite skin 102 on a second side (e.g., the foam 108 may bond the top composite skin 102 to the core 106). It should be appreciated that the foam 108 may have any suitable thickness that may be uniform and/or non-uniform at various portions thereof. Moreover, the foam 108 may be generally continuous or discontinuous.

The material in the foam 108 may vary from one embodiment to the next. For example, the foam 108 may include closed cell or open cell foam. Generally, the closed cell foam may be more water resistant than the open cell foam. For example, the closed cell foam may be used for applications when the composite component needs to be waterproof. In some embodiments, Rohacel foam may be used.

Generally, the thickness of the top and/or bottom composite skins 102, 104 may vary from one embodiment to the next. In some embodiments, the top composite skin 102 may be thinner than the bottom composite skin 104, or vice versa. In some embodiments, the top composite skin 102 may have the same thickness as the bottom composite skin 104. Furthermore, the foam 108 may be thicker or thinner than the top and/or bottom composite skin 102, 104.

In some embodiments, the foam 108 may improve impact resistance of the composite sandwich 100b and/or sound proofing thereof. It should be appreciated that in addition to or in lieu of foam 108, the composite sandwich 100b may include any number of suitable materials or combinations of material between the top composite skin 102 and the core 106. For example, the composite sandwich 100b may include paper, cardboard, other cellulose-base material, other foams, combinations of the foregoing, etc., that may be placed between the top composite skin 102 and the core 106.

Figure 4:
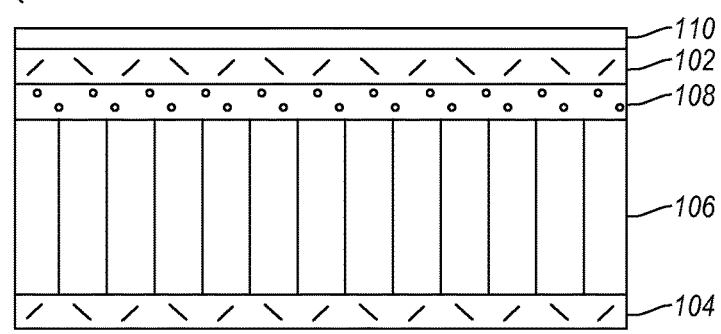
FIG. 4 is a partial cross-sectional view of a composite sandwich according to yet another embodiment.

As described herein, the composite sandwich may include any number of elements, components, layers, etc., between opposing composite skins, in addition to the core. Moreover, in some embodiments, the composite sandwich may include additional elements, components, layers, etc., bonded to outer surfaces of the top and/or bottom skins 102, 104. FIG. 4 illustrates a schematic side view of a composite sandwich 100c that has at least one outer surface free of surface defects in accordance with an embodiment. Except as otherwise described herein, the composite sandwich 100c and its elements and components may be similar to or the same as any of the composite sandwiches 100, 100a, 100b (FIGS. 1-3) and their corresponding elements and components. For example, the composite sandwich 100c may include top and bottom composite skins 102, 104 and a core 106 positioned therebetween and bonded thereto.

As shown in FIG. 4, in some embodiments, a polymer surface layer 110 may be attached and/or bonded to the top composite skin 102. The polymer surface layer 110 may be substantially free of surface defects, such as pin holes (e.g., on the outer surface thereof). In one or more embodiments, the polymer surface layer 110 may be formed from powders, such as thermoset powders, to provide a hard surface, or thermoplastic powders or powders of a mixture of a thermoset and a thermoplastic to provide toughness to the surface, as described in more detail in PCT International Application No. PCT/US2015/034072, entitled "Composite Sandwich Exhibiting Energy Absorption And/Or Including A Defect Free Surface" and is filed concurrently herewith. Moreover, embodiments disclosed herein relate to methods for increasing thickness for a composite sandwich as well as composite sandwiches produced by the methods. The method may use a thicker fiber sheet to produce a composite laminate or a pile of fiber sheets to produce multiple thinner composite laminates cured together to form a thicker composite laminate.

Figure 5:
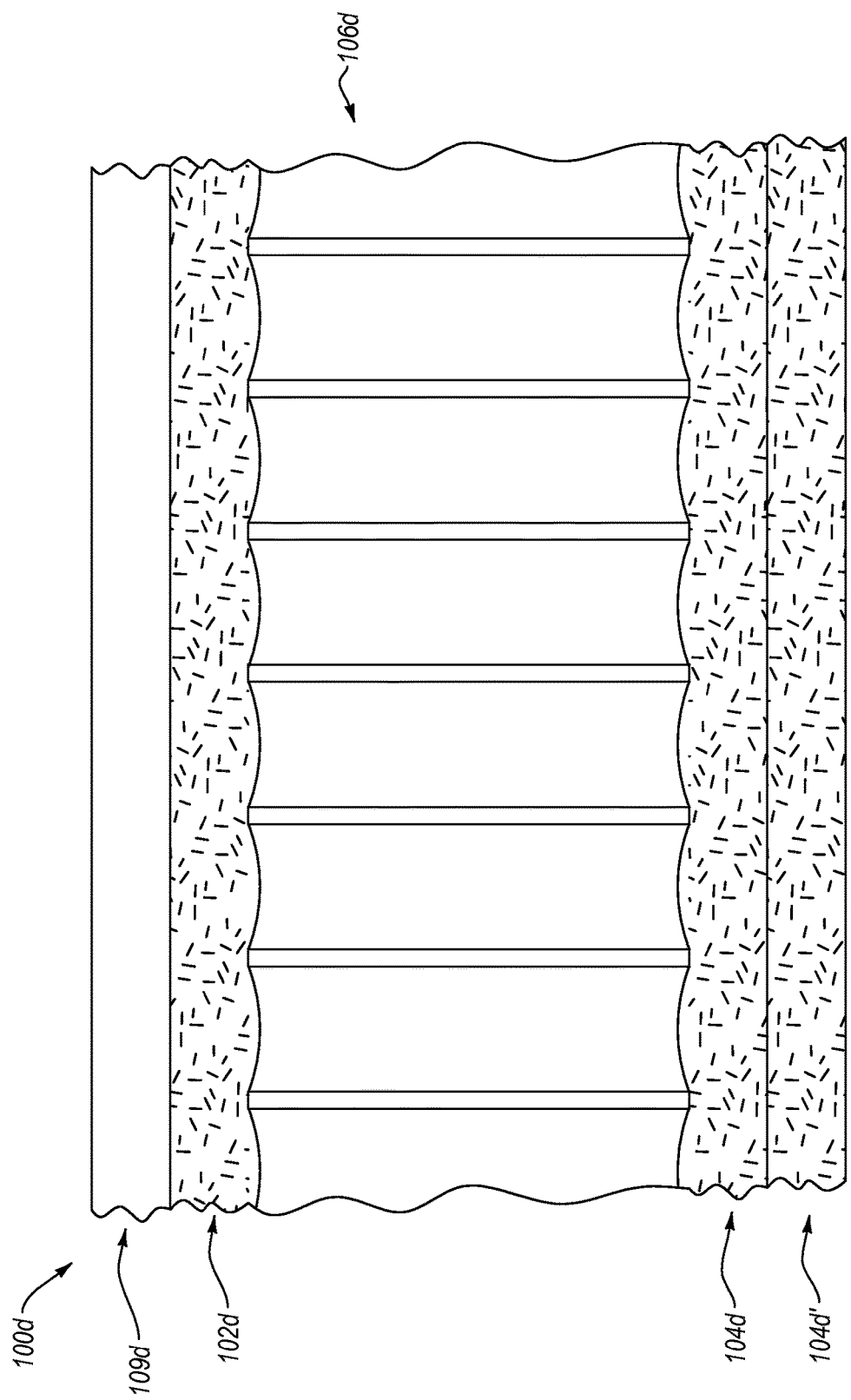
FIG. 5 is a partial cross-sectional view of a composite sandwich according to at least one embodiment.

FIG. 5 illustrates a schematic cross-sectional view of a composite sandwich 100d in accordance with an embodiment. Except as otherwise described herein, the composite sandwich 100d and its elements and components may be similar to or the same as any of the composite sandwiches 100, 100a, 100b, 100c (FIGS. 1-4) and their corresponding elements and components. For example, the composite sandwich 100d may include top and bottom composite skins 102d, 104d and core 106d positioned therebetween and bonded thereto, which may be similar to the top and bottom composite skins 102, 104 and the core 106 of the composite sandwich 100 (FIG. 1).

In some embodiments, the composite sandwich 100d may include a stack of or multiple composite skins. For example, the composite sandwich may include two bottom composite skins, such as first and second bottom composite skins 104d, 104d' and single top composite skin 102d. As described above, the top and bottom composite skins 102d, 104d, 104d' may include and/or may be formed from fiber sheets impregnated with polymer resin.

In the illustrated embodiment, the composite sandwich 100d may include an outer skin 109d that may be positioned on the top composite skin 102d and/or may be bonded to the outer surface thereof. For example, the outer skin 109d may include NCF, a woven fabric, combinations thereof, etc., which may help increase the resistance of the composite sandwich to pull out load and/or may reduce the print-through from the core. In an embodiment, the outer skin 109d may include NCF that has a bi-axial configuration (e.g., layers oriented at including 0° and 90° relative to an axis). The bi-axial NCF may have bi-directional strength and stiffness and flexible strength and stiffness. The outer skin 109d (e.g., the outer skin 109d that includes NCF) may provide greater resistance to pull out load, such as in a direction substantially parallel to the orientation of the outer skin 109d (e.g., in-plane with the outer skin 109d) and/or substantially perpendicular to the cross-section of the composite sandwich 100d.

In some embodiments, the outer skin 109d (e.g., NCF) may have fewer or substantially no indentations in the outer surface thereof, which may define the outer surface of the composite sandwich 100d. As described above, the composite sandwich 100d may be used in various applications, such as auto body components. For example, the outer skin 109d may face outward and/or define or form at least a portion of an exterior surface of an automobile. Accordingly, in some instances, an outer surface that is substantially free of indentations may have a greater aesthetic appeal than a comparable outer surface that includes indentations or dimples therein.

In an embodiment, the composite sandwich 100d may also include an outer skin (e.g., outer skin comprising NCF) on the bottom side of the composite sandwich 100d (e.g., attached and/or bonded to the second bottom composite skin 104d'), which may increase the resistance of the composite sandwich 100d to pull out loads and/or may help reduce print through from the core. Furthermore, the outer composite skin that may be bonded to the second bottom composite skin 104d' (e.g., to an outer surface of the second bottom composite skin 104d') may conceal or fill the dimples or indentations that may be formed in the outer surface of the second bottom composite skin 104d', to form a substantially smooth or un-dimpled surface.

Figure 6:
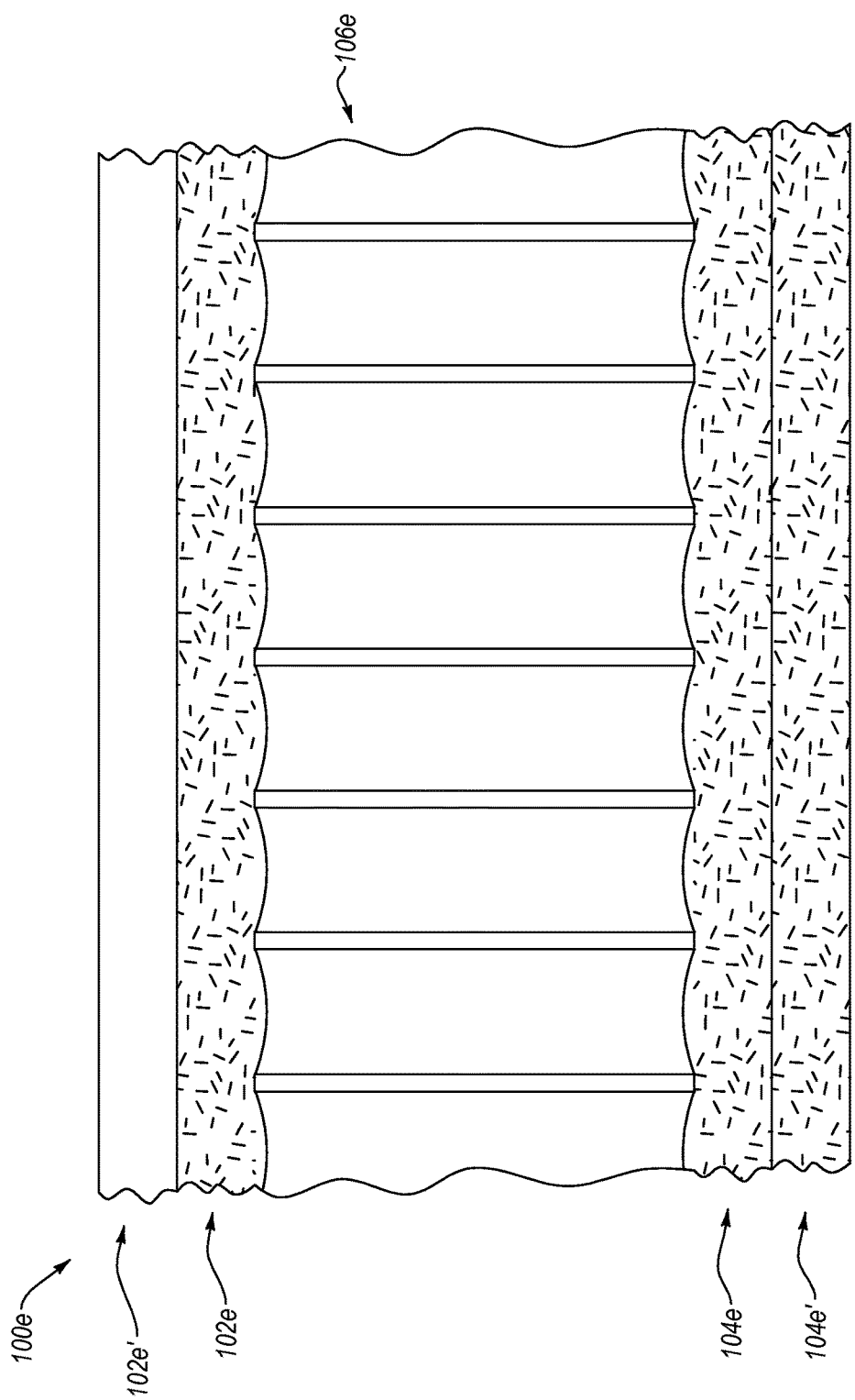
FIG. 6 is a partial cross-sectional view of a composite sandwich according to an embodiment.

FIG. 6 illustrates a schematic cross-sectional view of a composite sandwich 100e in accordance with an embodiment. Except as otherwise described herein, the composite sandwich 100e and its elements and components may be similar to or the same as any of the composite sandwiches 100, 100a, 100b, 100c, 100d (FIGS. 1-5) and their corresponding elements and components. For example, the composite sandwich 100e may include top and bottom composite skins 102e, 104e and a core 106e positioned therebetween and bonded thereto, which may be similar to the top and bottom composite skins 102, 104 and the core 106 of the composite sandwich 100 (FIG. 1).

In some embodiments, the composite sandwich 100e may include two composite skins on each side of the core 106e. More specifically, for example, the composite sandwich 100e may include first and second top composite skins 102e, 102e' bonded together and bonded to the core 106e, and first and second bottom composite skins 104e, 104e' bonded together and bonded to the core 106e. In the illustrated embodiment, the composite sandwich 100e does not include NCF forming an outer skin thereof, such that it may have lower resistance to pull out load than composite sandwich 100d (FIG. 5).

As described above, the top and/or bottom composite skins 102e, 102e', 104e, 104e' may be fabricated from a fiber sheet impregnated with a polymer resin. Accordingly, in some embodiments, two impregnated fiber sheets may bond together during fabrication of the composite sandwich 100e (e.g., as the impregnated fiber sheets are pressed against the core blank). In an embodiment, the polymer resin that impregnates adjacent fiber sheets (e.g., fiber sheets that would form the top composite skins 102e, 102e') may be the same or similar for both fiber sheets. Hence, for example, the composite skins formed therefrom may be integrated together (e.g., after curing, two or more fiber sheets of two or more adjacent composite skins may be embedded in a uniform or monolithic polymer matrix).

Figure 7:
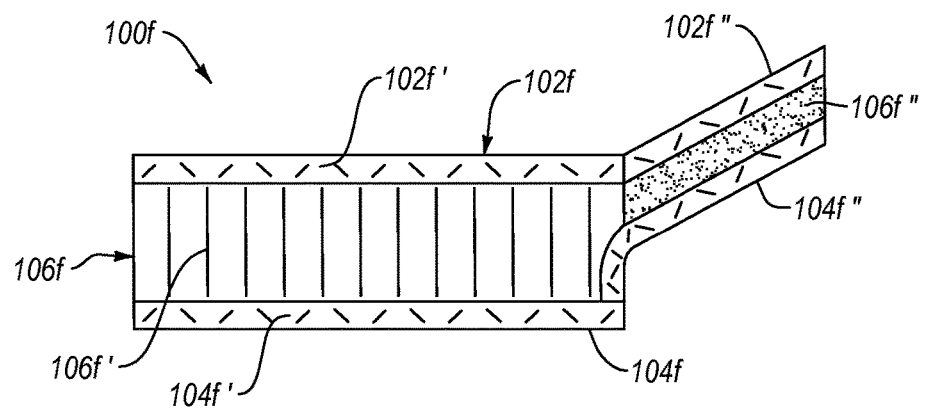
FIG. 7 is a partial cross-sectional view of a composite sandwich according to another embodiment.

FIG. 7 illustrates a schematic cross-sectional view of a composite sandwich 100f according to an embodiment. Except as otherwise described herein, the composite sandwich 100f and its elements and components may be similar to or the same as any of the composite sandwiches 100, 100a, 100b, 100c, 100d, 100e (FIGS. 1-6) and their corresponding elements and components. For example, the composite sandwich 100f may include top and bottom composite skins 102f, 104f and a core 106f positioned therebetween and bonded thereto, which may be similar to the top and bottom composite skins 102, 104 and the core 106 of the composite sandwich 100 (FIG. 1).

As described above, a composite sandwich may be fabricated by compressing the core blank to form the core 106f of the composite sandwich 100f. Moreover, different portions of the core blank may be compressed to different heights or thicknesses. For example, a first portion of the core blank may be compressed to a first thickness to form a first portion 106f' of the core 106f that has the first thickness (as defined by the distance between corresponding first portions 102f', 104f' of the top and bottom composite skins 102, 104). Moreover, a second portion of the core blank may be compressed to a second thickness (e.g., smaller than the first thickness) to form a second portion 106f'' of the core 106f that has the second thickness (as defined by the distance between corresponding second portions 102f'', 104f'' of the top and bottom composite skins 102, 104).

In other words, the composite sandwich 100f may include two or more portions that have different thicknesses. Moreover, by varying the thickness among the various portions during fabrication, the composite sandwich 100f may be configured to have a three-dimensional configuration or shape. The core blank may be compressed to any suitable thickness to form the core 106 (e.g., to a thickness between 3 mm and 60 mm). Moreover, of the core blank have any suitable thickness which may be between 3 mm and 60 mm. In some embodiments, the maximum height of the hard core may vary depending upon the diameter of the tube and may not be too large, such as to cause the core to buckle. In an embodiment, the soft core may have any suitable height because the soft core may not buckle, but may deform at opposite ends of the soft core. In some embodiments, a core blank may include multiple cells (e.g., cells having generally tubular configuration, which may be formed from tubular members, such as tubes or straws), which during fabrication of the composite sandwich 100f may be compressed, bent, softened, at least partially melted, or combination of the foregoing, as heat and pressure is applied to the core blank and to the at least partially uncured top and bottom composite skins 102, 104.

Accordingly, in some embodiments, the core 106f may include members of the core blank (e.g., tubular members, such as tubes or straws) that were compressed, bent, softened, at least partially melted, or combinations thereof. For example, the members of the core blank that form the core 106 may be plastically or elastically deformed. Moreover, the amount of compression, softening and/or melting, bending, residual stresses, etc., in the members of the core blank that form the core 106*f* may vary from one portion to another portion of the core 106*f*, to produce suitable and/or predetermined thicknesses in such portions, as described above. It should be also appreciated that, as described above, the core 106*f* may include compressible foam or any number of other suitable compressible materials. Hence, for example, core blank of suitable compressible material may be compressed (e.g., by compressing and/or melting the material) to any number of suitable and/or predetermined thicknesses to fabricate the three-dimensional shape of the composite sandwich 106*f*.

In some embodiments, a portion of the core blank may be compressed to form a substantially solid portion of the core 106*f*. In the illustrated embodiment, the second portion 106*f*" of the core 106*f* may be substantially solid. For example, the tubular members that may form the cells of the core blank may be softened and/or melted and compressed to form a substantially solid or monolithic thermoplastic and/or thermoset material that defines the second portion 106*f*" of the core 106*f*.

Generally, compressibility of the material of the core 106*f* may be different than compressibility of the core blank used to fabricate the core 106*f*. In some embodiments, one or more portions or the entire core 106*f* may be substantially incompressible (e.g., the core blank may be compressed to form a substantially monolithic core 106*f* that may be substantially incompressible as compared with compressibility of the core blank). Moreover, in some configurations, the core 106*f* may exhibit less compressibility than the core blank. In any event, the compressibility of the core 106*f* may vary from one portion thereof to another as well as from one embodiment to another, and may depend on the configuration of the core 106*f* (e.g., after fabrication), and the material(s) used, operating temperature, etc.

It should be appreciated that the various portions of the core 106*f* may have the same material or different materials. For example, the entire core 106*f* may be fabricated from substantially the same material. In some embodiments, one or more portions of the core 106*f* may be fabricated from core blank that include cells with smaller cavities than one or more other portions. For example, the second portion 106*f*" may have cells with smaller cavities than the cavities in first portion 106*f*'. In an embodiment, the relatively smaller cavities may limit or eliminate formation of dimples or indentations in outer surface of the top and/or bottom composite skins 102, 104 (e.g., by preventing or limiting entry of the impregnated fiber sheet (used to form the composite skins) into the cavities of the cells in the core 106*f*.

Figure 8:
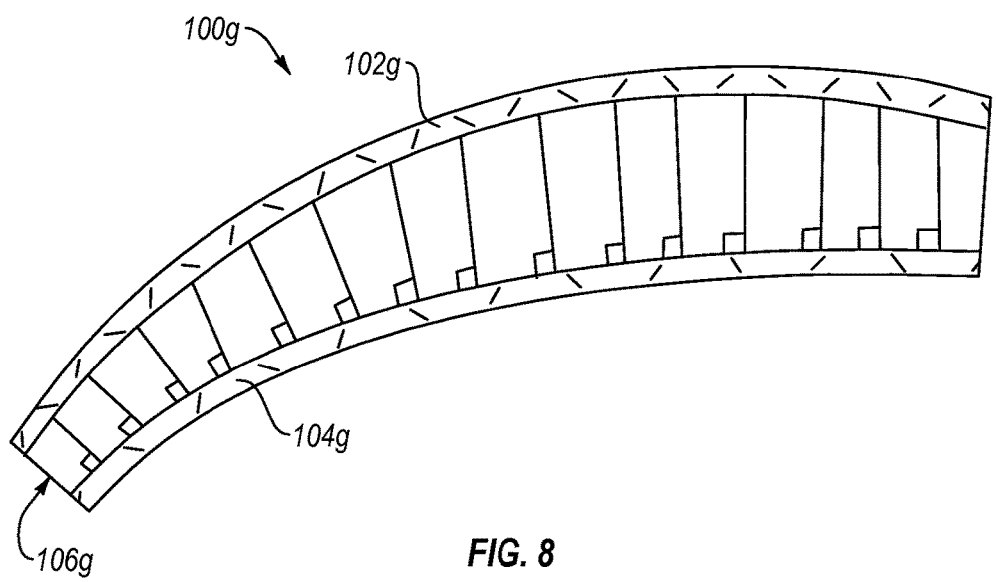
FIG. 8 is a partial cross-sectional view of a composite sandwich according to yet another embodiment.

It should be appreciated that the composite sandwich 100*f* may include any number of additional layers and/or materials positioned between the top and bottom composite skins 102*f*, 104*f* and/or on the outer surfaces thereof (e.g., a plastic foam layer, a polymer surface layer, etc., as described above). Furthermore, in some embodiments, the composite sandwich 100*f* may have generally planar outer surfaces, as defined by the top and/or bottom composite skins 102*f*, 104*f*. Alternatively, the composite sandwich may have nonplanar outer surfaces. FIG. 8 illustrates a schematic cross-sectional view of a composite sandwich 100*g* according to an embodiment.

Except as otherwise described herein, the composite sandwich 100*g* and its elements and components may be similar to or the same as any of the composite sandwiches 100, 100*a*, 100*b*, 100*c*, 100*d*, 100*e*, 100*f* (FIGS. 1-7) and their corresponding elements and components. For example, the composite sandwich 100*g* may include top and bottom composite skins 102*g*, 104*g* and a core 106*g* positioned therebetween and bonded thereto, which may be similar to the top and bottom composite skins 102, 104 and the core 106 of the composite sandwich 100 (FIG. 1). In an embodiment, the outer surfaces of the composite sandwich 100*g* (e.g., outer surfaces of the top and/or bottom skins 102*g*, 104*g*) may be nonplanar.

Moreover, in some embodiments, one or more portions of the top and bottom composite skins 102*g*, 104*g* may be generally parallel to each other (e.g., the thickness of the core 106*g* may be generally uniform at the portions of the composite sandwich 100*g* where the top and bottom composite skins 102*g*, 104*g* are parallel to each other). Alternatively, one or more portions of the top and bottom composite skins 102*g*, 104*g* may be non-parallel to each other. As shown in FIG. 8, the thickness of the core 106*g* may vary (e.g., continuously), such that the top and bottom composite skins 102*g*, 104*g* are positioned and oriented to be non-parallel to each other. For example, the top composite skin 102*g* may have a first three-dimensional shape or configuration (e.g., may be curved, bent, etc.), and the bottom composite skin 104*g* may have a second three-dimensional shape or configuration that is different from the first three-dimensional configuration. Furthermore, the variations in the thickness of the core 106*g* may accommodate or form the three-dimensional shape of the composite sandwich 100*g* (e.g., by varying the distance between the top and bottom composite skins 102*g*, 104*g*; the thicknesses of the top and bottom composite skins 102*g*, 104*g* may be generally uniform).

As described above, the core 106*g* may be fabricated by compressing a core blank between the top and bottom composite skins 102*g*, 104*g* to a suitable thickness, which may vary from one portion of the core 106*g* to another. Moreover, in some embodiments, the core 106*g* may include at least partially compressed cells (e.g., the cells may be defined by walls, and the walls may be compressed during fabrication of the composite sandwich 100*g*). In some embodiments, the walls of the cells may be formed by tubular members, such as straws. In any event, in at least one embodiment, the walls that define the cells of the core 106*g* may be generally perpendicular to the top and/or bottom composite skins 102*g*, 104*g* (e.g., perpendicular to a planar inward facing or inner surfaces of the top and/or bottom composite skins 102*g*, 104*g* and/or perpendicular to an imaginary line that is tangent to the non-planar inner surfaces of the top and/or bottom composite skins 102*g* at the point of contact with the wall(s) defining the cells of the core 106*g*).

Figure 9:
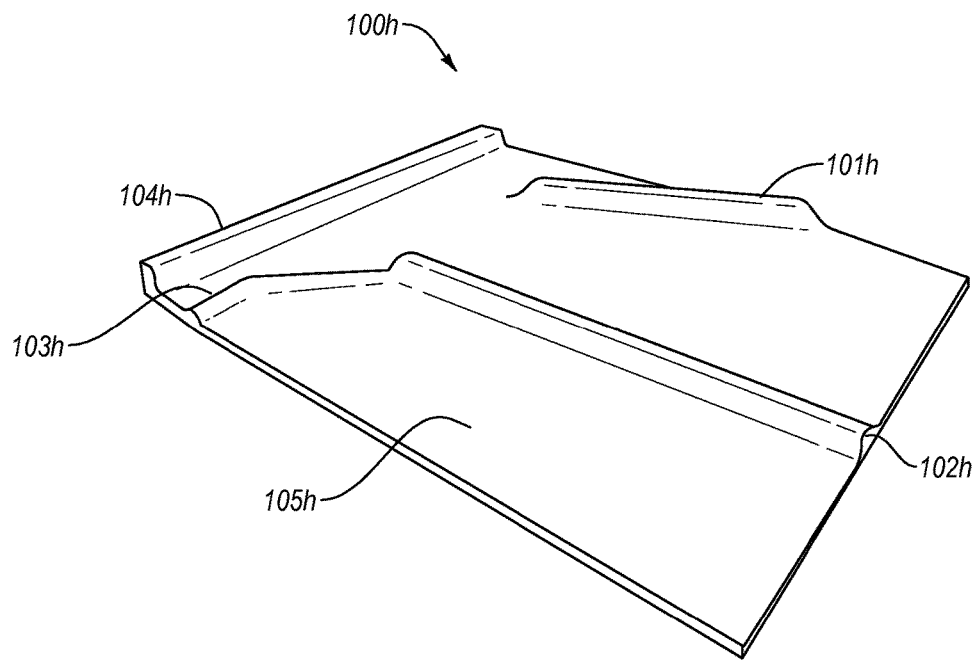
FIG. 9 is an isometric view of a composite sandwich according to at least one embodiment.

FIG. 9 is an isometric view of composite sandwich 100*h* in accordance with one or more embodiments. As shown, the composite sandwich 100*h* has portions with several different thicknesses. For example, the top and/or the bottom composite skins may have generally uniform thickness, and the core of the composite sandwich 100*h* may have different thickness at different portions thereof, such as to define the outer shape of the composite sandwich 100*h*. Additionally or alternatively, the top and/or bottom skins of the composite sandwich 100*h* may have different thicknesses at different portions thereof and may at least in part define the varying thicknesses in the composite sandwich 100*h*.

Moreover, as shown in FIG. 9, varying thicknesses among different portions of the composite sandwich 100f may define or form the three-dimensional shape of the composite sandwich 100h (e.g., as compared with a substantially flat or sheet-like composite sandwich). In particular, for example, the composite sandwich 100h has portions 101h-105h that have different shapes and thicknesses one from another. For example, the portion 105f may be generally planar or flat (e.g., sheet-like) and may be thinner than portions 101h-104h. By contrast, portions 101h-104h may be thicker than the portion 105h and may have generally three-dimensional configuration.

Figure 10:
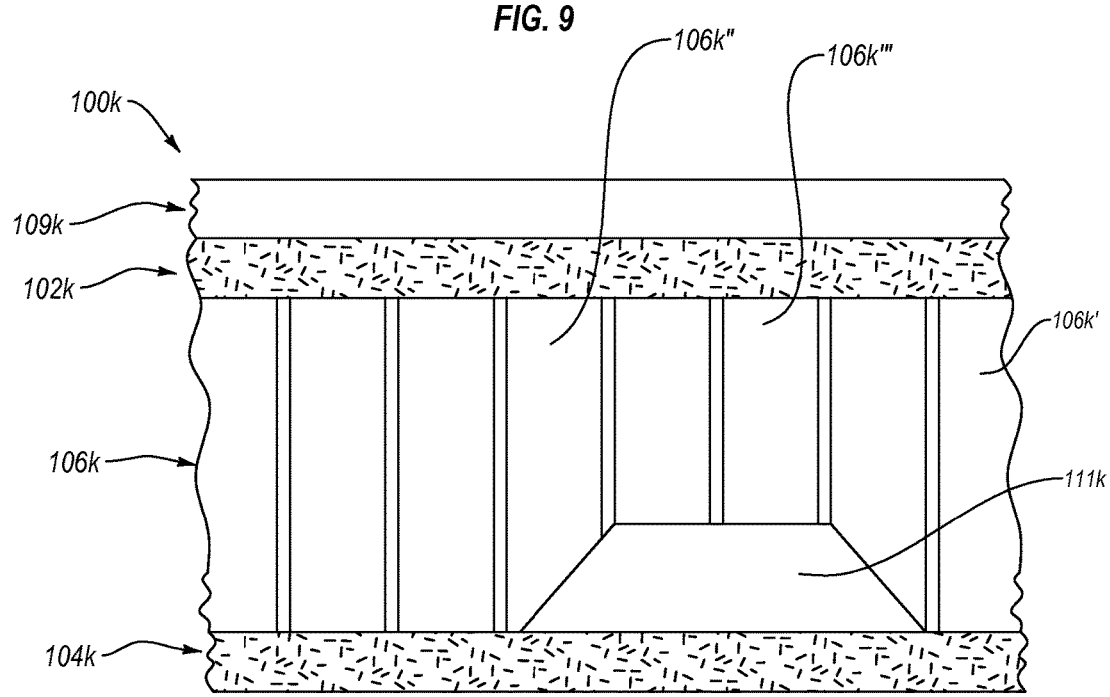
FIG. 10 is a partial cross-sectional view of a composite sandwich according to an embodiment.

FIG. 10 shows a schematic cross-sectional view of a composite sandwich 100k that includes and an insert 111k according to an embodiment. Except as otherwise described herein, the composite sandwich 100e and its elements and components may be similar to or the same as any of the composite sandwiches 100, 100a, 100b, 100c, 100d, 100e, 100f, 100e (FIGS. 1-8) and their corresponding elements and components. For example, the composite sandwich 100g may include bottom composite skin 104k bonded to a core 106k on a first side and a top composite skin 102k together with an outer skin 109k bonded to the core 106k on the second, opposing side thereof in a similar manner as in the composite sandwich 100d (FIG. 5).

In the illustrated embodiment, the composite sandwich 100k includes the insert 111k. Generally, the insert 111k may include or be formed from any suitable material. The insert 111k may include metal, plastic, glass, wood, among other suitable materials. In some embodiments, the insert 111k may be positioned between a composite skin and the core. For example, the insert 111k may be positioned between the bottom composite skin 104k and the core 106k. In an embodiment, the core blank that forms the core 106k may be partially or fully compressed and/or softened and/or melted around the insert 111k (e.g., compressing and/or softening and/or melting the core 106k about the insert 111k may bond together the insert 111k and the core 106k).

In some embodiments, the core blank forming the core 106k may be compressed more at or near the portion containing the insert 111k than at one or more other portions. In some configurations, the core 106k may be formed from a core blank that is substantially uncompressed in some portions (e.g., at portion 106k' of the core 106k) during fabrication. Additionally or alternatively, the core 106k may be formed from a core blank that is partially compressed or substantially fully compressed during fabrication (e.g., at portions 106k" and 106k'" of the core 106k). It should be appreciated, however, that (as described above) that composite sandwich 100k may include a core 106k that is formed by compressing a core blank by any suitable amount or percentage at any number of suitable locations and/or portions thereof during fabrication.

As described above, the composite sandwiches described herein may be used in any number of applications. For example, the composite sandwich 100k may be configured to be used for seat mountings in automobiles. The seat mounting may require the composite sandwich 100k to exhibit a relatively high pull out load. If the seat mounting is formed of a composite sandwich 100k, which includes outer skin 109k comprising NCF and/or another outer skin (e.g., on a bottom of the composite sandwich 100k), the outer skins may, for example, prevent or impede a seatbelt from pulling out of the seat mounting (e.g., the seatbelt may connect to the insert 111k, and the outer skin 109k may prevent or impede pull-out of the insert). For example, when a car stops suddenly, the seatbelt may be pulled in a manner that applies an outward directed force on the insert 111k of the composite sandwich 100k, and one or more outer skins that include NCF, such as the outer skin 109k, may prevent or impede the insert 111k from moving and/or being pulled out of the composite sandwich 100k.

Figure 11:
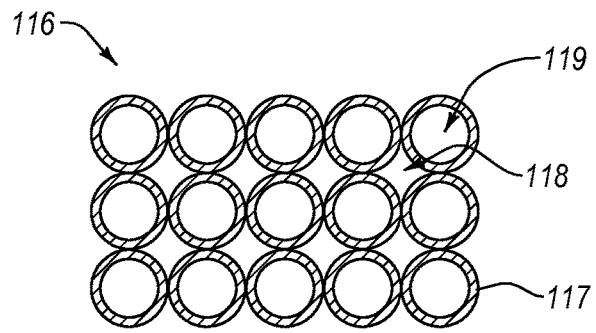
FIG. 11 is a top view of a core blank for fabricating a composite sandwich according to an embodiment.

As described above, the core of the composite sandwich may include any number of suitable elements, configurations, materials, etc., which may vary from one embodiment to the next. In some embodiments, the core may be defined or formed by multiple connected cells (e.g., honeycomb and the like). FIG. 11 illustrates a schematic top view of a core blank 116 according to an embodiment. It should be appreciated that the core blank 116 may be used in and/or incorporated into any of the composite sandwiches described herein. Moreover, the core blank 116 may have any suitable size (e.g., the core blank 116 may extend between edges of one or more skins, such as to form a composite sandwich of any suitable size). In some embodiments, the core blank may extend beyond the edges of the skin and/or (at least in some portions) the skins may extend beyond the outer perimeter of the core blank. For example, after processing and forming a composite sandwich, the outer perimeter of the composite sandwich may be cut or trimmed to a selected or suitable size and/or shape.

In an embodiment, the core blank 116 may be include and/or may be formed from tubular members 117 that may be bonded together. Alternatively, the tubular members 117 of the core blank 116 may be positioned near and/or in contact with one another but walls of the tubular members 117 may remain unattached to one another. Furthermore, the tubular members 117 may have any number of suitable arrangements. In the illustrated embodiment, the tubular members may be arranged in generally parallel rows and columns (e.g., centers of the tubular members 117 in the same row may lie along a generally straight first line, centers of the tubular members 117 in the same column may lie a generally straight second line, and the second line may be generally perpendicular to the first line). In any event, the core 117 may be positioned between composite skins and may be bonded thereto to form the composite sandwich.

The tubular members 117 of the core blank 116 may form or define cells 118, 119. In particular, the walls of the tubular member 117 may define cells 118, 119 of the core blank 116. For example, the cavities of the cells 118 may be generally cylindrical (e.g., defined by the generally cylindrical interior of the tubular members 117. In some embodiments, the cavities of the cells 119 may be approximately diamond-shaped or square prismoid (e.g., as defined by the space between four tubular members 117).

The tubular member 117 may have any suitable height that may define the height or thickness of the core blank 116. Moreover, the tubular members 117 may comprise a suitably compressible material, such that the core blank 116 may be compressed to form a core that has one or more suitable heights that may vary from one portion of the core to another. Additionally or alternatively, the tubular members 117 may comprise material that may soften and/or melt at suitable temperature(s), in a manner that facilitates compressing the tubular members 117 and the core blank 116 (e.g., without damaging or breaking the tubular member 117). For example, as the tubular member 117 of the core blank 116 are compressed and/or softened and/or melted, the walls of such tubular member 117 may bend, fold, soften, melt, etc., into the cavities of the cells 118, 119 (e.g., into the cavities inside the tubular members 117 and/or into the cavities between the tubular members 117).

Figure 12:
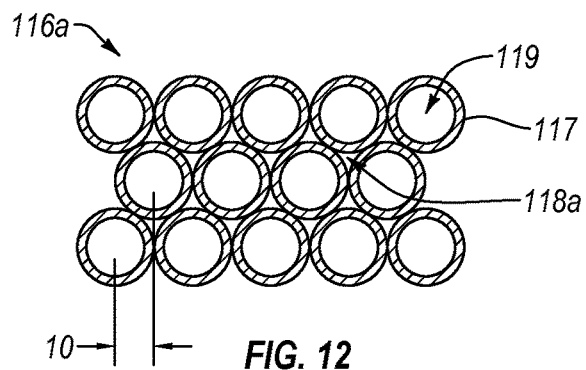
FIG. 12 is a top view of a core blank for fabricating a composite sandwich according to another embodiment.

As mentioned above, a core blank may include tubular members that may be arranged in any number of suitable arrangements. FIG. 12 is a schematic top view of a core blank 116a that includes tubular members 117 arranged in offset rows, according to an embodiment. Except as otherwise described herein, the core blank 116a and its elements and components may be similar to or the same as the core blank 116 (FIG. 11) and its corresponding elements and components. For example, two, some, or all of the rows of tubular members 117 may be laterally offset from one or more neighboring or adjacent rows of tubular members 117. In some embodiments, offset distance 10 between the rows may be approximately one half the width of tubular member 117 (e.g., approximately ½ of the outside diameter of the tubular member 117).

Moreover, in an embodiment, the core blank 116a may include cells 118a, 119 defined by the tubular members 117. For example, cavities of cells 118a (e.g., defined by the corresponding gaps between exterior surfaces of adjacent tubular members 117) may be generally triangular prismoid. In some embodiments, the cavities of the cells 118a may be smaller than the cavities of the cells 118 (FIG. 11). It should be appreciated that, while in some embodiments the cells of the core blank may be formed from multiple tubular members, in additional or alternative embodiments, the cells of core blanks may have any number of configurations and may be formed from any number of suitable components. For example, the cells may be machined from a solid block, core blank may be extruded, such that the cells are defined by a single wall, instead of partial double-walls formed by tubular members, may be formed from a folded sheet, etc. In any event, the walls of the cells in the core blank may be deformable by pressing and/or heating to form the core of a composite sandwich, in a manner described herein.

Figure 13:
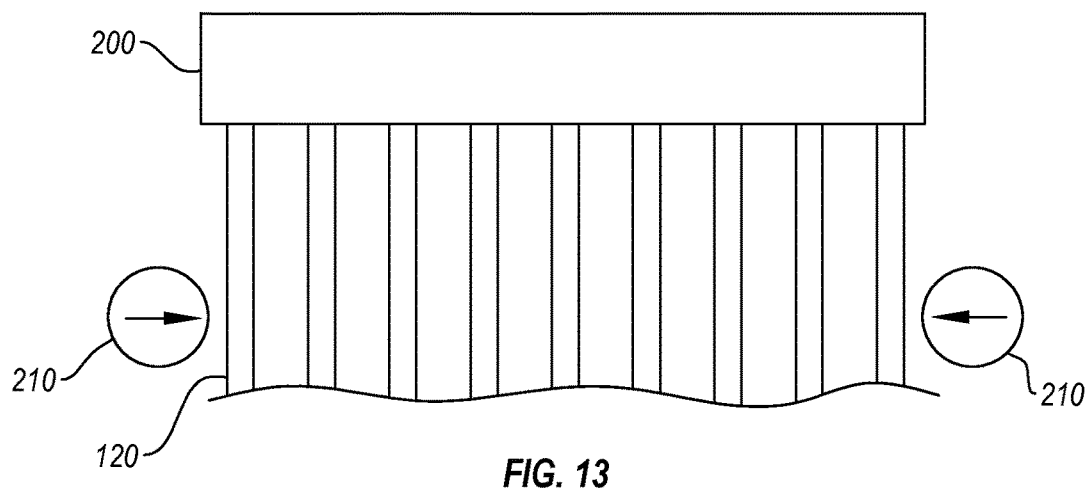
FIG. 13 is a schematic illustration of an extrusion machine for extruding one or more portions of a core blank according to an embodiment.

In some embodiments, at least a portion of a core blank that includes multiple tubular members may be extruded (e.g., in a manner that the tubular members of the core blank are bonded together after extrusion). FIG. 13 illustrates a schematic side view of a bundle of plastic tubes 120 extruded and hot bonded together in accordance with an embodiment. As shown, the tubes 120 may be extruded from extruding machine 200 and/or pressed by hot rollers 210 from one or more sides, such that the plastic tubes 120 are thermally bonded together to form a bundle of plastic tubes, which may be used as a core blank and, subsequently, may form a core of a composite sandwich.

For example, the tube bundles may be cut at predetermined spacing during and/or after extrusion to define the height of the core blank. Moreover, multiple tube bundles may be positioned together and/or bonded together to form a suitable core blank. Hence, in some embodiments, two, some, or all of the tubular members may have the same or similar height (e.g., to form a core blank that has generally uniform thickness), while in alternative or additional embodiments, two, some, or all of the tubular members of the core blank may have different heights (e.g., to form a core that has a variable thickness).

Figure 14:
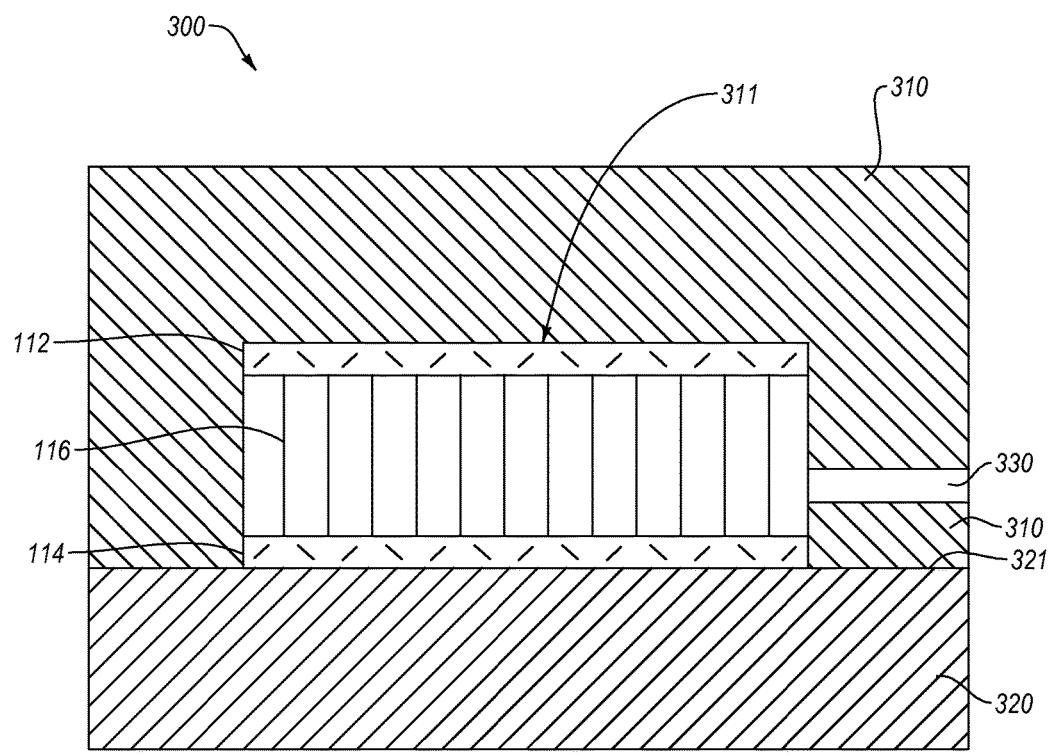
FIG. 14 is a cross-sectional view of a compression mold according to an embodiment.

FIG. 14 illustrates a schematic diagram of a compression mold 300 for fabricating a composite sandwich in accordance with one or more embodiments. Generally, a stack assembly may be positioned and at least partially process in the mold 300 to fabricate a composite sandwich. The mold 300 may include an upper mold portion 310 and a lower mold portion 320. When closed together, the upper and lower mold portions 310, 320 define a cavity and/or core configuration that may compress the stack assembly to form a composite sandwich (e.g., a stack assembly may include fiber sheets impregnated with polymer resin and core blank positioned therebetween).

For example, the upper mold portion 310 may include a cavity 311 that may facilitate placement of at least a portion of the stack assembly therein. For example, a first fiber sheet 112, which may be impregnated with a polymer resin, a core blank 116, and a second fiber sheet 114 impregnated with the polymer resin. The mold 300 may also include a lower mold portion 320. In the illustrated embodiment, the lower mold portion 320 has a generally flat top surface 321. For example, the stack assembly may be closed in the processing volume formed between the upper and lower mold portions 310, 320 (e.g., such as to compress the stack assembly to a selected thickness and/or into a selected shape to form composite sandwich of such thickness and shape). That is, the mold 300 may be positioned in a press and the upper and lower mold portions 310, 320 may be pressed together, thereby compressing the stack assembly.

In some embodiments, the mold 300 may be heated during fabrication (e.g., to cure the polymer resin in the first and/or second fiber sheets, to soften and/or melt one or more portions of the core blank, etc.). As described above, composite skins may include discontinuous and/or continuous fibers embedded in a polymer matrix (e.g., solidified polymer resin). The composite laminates are also bonded to the core during the composite molding. In some embodiments, composite skins that include randomly oriented discontinuous and/or continuous fibers may be more bendable and/or stretchable than comparable composite skins that include continuous fibers.

In one or more embodiments, gas (e.g., air) may be withdrawn from the processing volume of the mold 300. For example, the mold 300 may also include an outlet 330 that may be connected to a vacuum pump (not shown) to evacuate gas from the internal processing volume of the mold 300 (e.g., thereby producing at least a partial vacuum) in the processing volume of the mold 300, when the mold 300 is in the closed configuration.

The upper and lower mold portions 310, 320 may include any suitable material that may be suitable for the selected operating pressures and/or temperatures of the mold 300. For example, the upper and lower mold portions 310, 320 may be fabricated from a suitable metal, such as steel, aluminum, etc. (e.g., in some instances, steel may be more suitable for higher pressure processing than aluminum). In some embodiments, a porous surface of the mold 300 (e.g., of the upper and/or lower portions 310, 320 fabricated from aluminum) but may be sealed with a mold sealant. The low pressure compression molding process can significantly reduce the equipment cost compared to the high pressure RTM, for example, by using an aluminum mold rather than a steel mold to reduce machining cost, also by using a thinner mold wall to reduce the cost of mold material. Specifically, the aluminum mold wall is thinner than the steel mold wall for the high pressure RTM. For example, the aluminum mold wall may be about 10 mm thick or less for the low pressure compression molding, while the steel mold wall is about 30 mm thick for RTM. Additionally, the pressure or load machine generates a lower load for the low pressure compression molding than the high pressure RTM.

Figure 15:
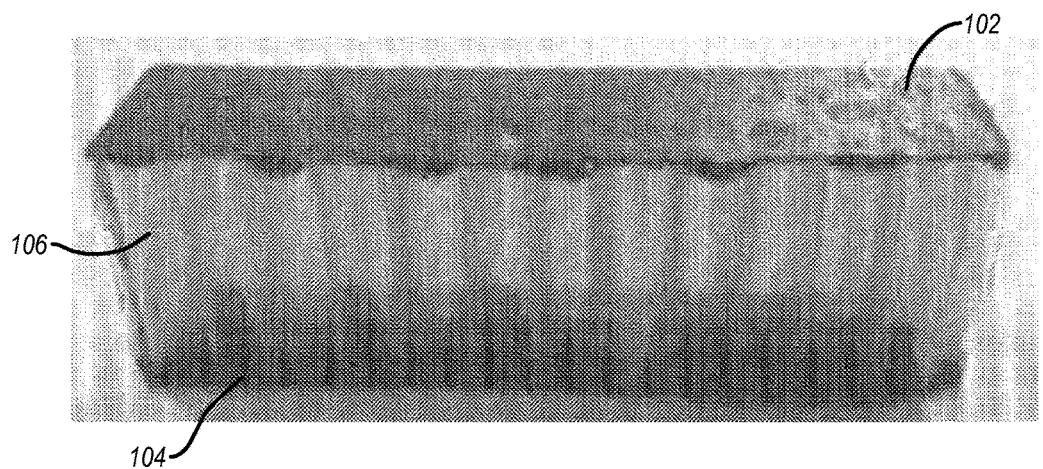
FIG. 15 is a photograph of a sample composite sandwich fabricated according to an embodiment.

It should be appreciated that any of the composite sandwiches described herein may be fabricated with the mold 300 or with a similar mold, which may be suitably configured for such fabrication. FIG. 15 is a sample composite sandwich 100m fabricated according to an embodiment descried herein. More specifically, the composite sandwich 100*m* was fabricated by impregnated fiber sheets and a core blank formed from drinking straws, thereby forming the composite skins 102*m*, 104*m* and the core 106*m* of the composite sandwich 100*m*. The core 106*m* has a height of about 20 mm. The ends of the drinking straws of the core blank were softened or melted to form the core 106*m* and to bond to the composite skins 102 and 104.

Figure 16:
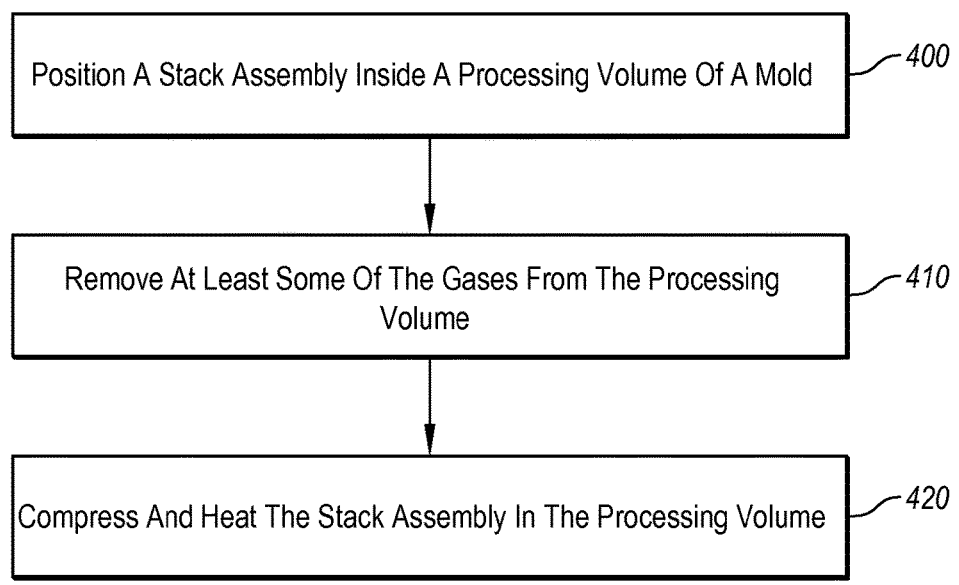
FIG. 16 is a flow chart for a method of fabricating a sandwich assembly according to an embodiment.

FIG. 16 is a flow chart for a method of fabricating a composite sandwich according to an embodiment. For example, the method may include an act 400 of positioning a stack assembly inside a processing volume of a mold. In some embodiments, the stack assembly may be assembled inside the processing volume. Alternatively, at least a portion of the stack assembly may be assembled outside the processing volume. As described above, the stack assembly may include any number of elements and components that, when processed in the mold, may form the composite sandwich. For example, the stack assembly may include two fiber sheets impregnated with a polymer resin and a core blank positioned therebetween (e.g., when processed together, the impregnated fiber sheets may form the composite skins and the core blank may form the core of the composite sandwich).

According to at least one embodiment, before the mold is closed to define the processing volume, a polymer resin may be sprayed onto a first fiber sheet and/or a second fiber sheet at operation. By spraying the polymer resin onto the fiber sheet before closing a mold, the stack assembly may be processed at a lower pressure than the high pressure RTM and may suitably impregnate the fibers. To spray the resin, commercial spray heads may be used for high volume production of large parts. For the low pressure compression molding process, a hot pressure pot may be used for low volume production of small parts or prototypes instead of the commercial spray heads, which may reduce manufacturing cost. The low pressure hot pot is capable of spraying the resin.

The polymer resin may be polyurethane, epoxy, another suitable polymer resin, or a mixture of any of the foregoing. A low viscosity mixture may be easier to spray. For a polymer resin, the viscosity may be reduced by warming the resin in hot pressure pot and to delay the start of hardening until in the compression molding. The hardener for the polymer resin including the mixture may be selected such that the epoxy and the polyurethane have about the same or similar curing time. Facilitating the same or similar curing times may allow the two thermosets (e.g., epoxy and polyurethane) to complete curing together without lengthening the curing process due to one of the thermosets in the polymer resin.

In some embodiments, the method also may include an act 410 of removing at least some of the gases from the processing volume of the mold and from the fiber sheets. For example, as described above, a vacuum pump may evacuate the gases from the processing volume, thereby producing a reduce pressure or at least partial vacuum therein. The method may also include an act 420 of compressing and heating the stack assembly in the mold. In particular, for example, as the stack assembly is heated and compressed, the polymer resin may cure and/or may bond the impregnated fiber sheet to the core blank. Moreover, the core blank and the polymer resin with reinforcement fiber may be formed into a suitable shapes, as the stack assembly is compressed and heated. For example, the polymer resin with the reinforcement fibers may cure to form the composite skins of a selected shape and/or thickness, and the core blank may be compressed and/or softened and/or melted to form the core of a selected shape and thickness(es).

In some embodiments, a processing pressure applied to the stack assembly may range from 5 bars to 10 bars (e.g., about 6 bars (about 88 psi)), which may be significantly lower than the pressure of about 120 bars (1764 psi) typically used in a conventional RTM. It should be appreciated, however, that the processing pressure may be greater than 10 bars or lower than 5 bars. It should be also appreciated that the acts or steps described herein may be performed in any suitable order that may vary from one embodiment to the next.

In some embodiments, processing the stack assembly may produce a composite sandwich that has one or more outer surfaces substantially free of pinholes or porosity (e.g., the outer surface(s) may be shinny and/or may facilitate painting thereof). Additionally or alternatively, one or more of the outer surfaces of the composite sandwich may include a polymer with a high glass transition temperature such that the surface can withstand high temperatures for the post processing. In some embodiments, composite sandwiches that may be used as various automotive components, such as hoods, door panels, etc., may be required to withstand relatively high operating temperatures. For example, the composite sandwich may be e-coated at about 180° C. and then primed at about 140° C., which may be followed by a painting process.

Figure 17:
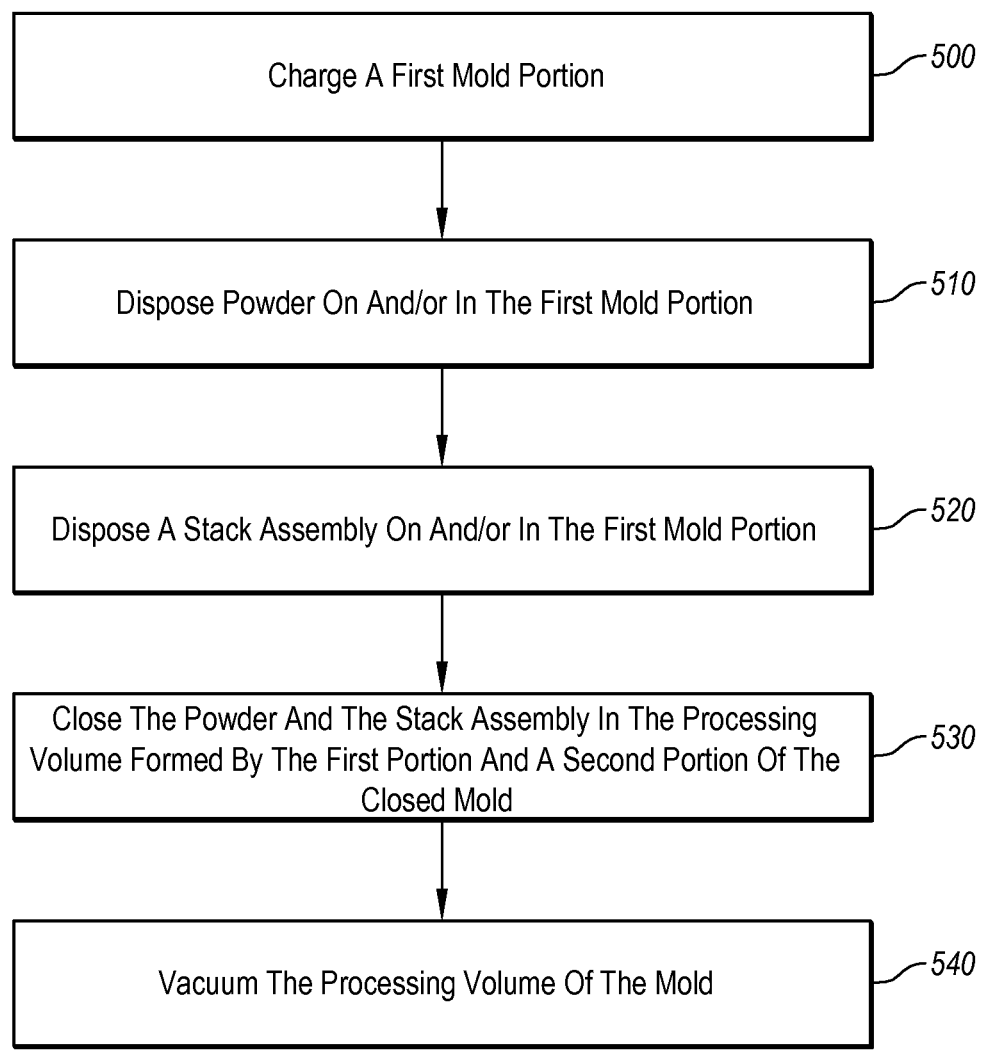
FIG. 17 is a flow chart for a method of fabricating a sandwich assembly according to another embodiment.

FIG. 17 is a flow chart for a method for fabricating a composite sandwich according to one or more embodiments. In some embodiments, the method may include an act 500 of electrostatically charging a first mold portion. For example, the first mold portion may be charged to help retain a charged thermoplastic and/or thermoset powder therein. The electrostatic charging also may help to reduce the waste of powders and/or may keep work space surrounding the mold generally free of powder.

In an embodiment, the method may include an act 510 of placing or disposing one or more powders (e.g., thermoplastic and/or thermoset powders) on and/or in the first mold portion. For example, a powder spray gun may spray the powder(s) onto and/or into the first mold portion. Moreover, in some embodiments, the powders may be spread generally uniformly over one or more surfaces of the first mold portion. By applying the powders to a mold surface, the air trapped in the fibers may be pulled out through the gap between the fiber layer and the tool surface and through the gaps or spaces between individual granules or particles of the powder(s). The powder(s) also may facilitate forming an outer surface of the composite sandwich substantially without pin holes.

Generally, the granules or particles of the powder(s) may vary in size and/or shape. In some embodiments, the granules or particles may be sized and/or shaped to allow the air trapped in the discontinuous fibers to be effectively removed by vacuum (e.g., by passing in the spaces between granules). In some configurations, continuous fibers may be less likely to trap air than discontinuous fibers. In at least one embodiment, air may be effectively removed out of the waste fibers recycled from RTM.

The amount of powder used may vary from one embodiment and, among other things, may depend on the size and/or shape of the granules of the powder(s). In some embodiments, the size of the powder granules may range from about 40 µm to about 100 µm. The powders may include a hardener surrounded by a polymer resin shell, which may start to cure, but not cured yet. The powders may become soft when first heated to an elevated temperature and then start to cure or cross-linking to form a solid coating layer (e.g., which may be about 100 µm thick or more).

The powders may be a thermoset, such as epoxy, which may provide hardness to one or more outer surfaces of the composite sandwich. The powders may also be a thermoplastic, such as polypropylene, polyethylene, nylon, polyester. The powders may also be a blend of thermoset and thermoplastic. The thermoplastic or the blend may provide some toughness to the surface and/or may also help reduce shrinkage caused by curing the thermoset powders. The powders may also have a high glass transition temperature ($T_g$) or a high melting temperature, such that the powders can withstand high post-processing temperatures. Moreover, in some embodiments, the powder may have a higher $T_g$ temperature than the polymer used to form a matrix of the composite skin, such that the powder may remain in a solid or softened form for sufficient amount of time to facilitate removal of air from the stack assembly. The thermoset may be in a liquid form prior to curing and becomes solid after curing, which includes cross-linking of polymer chains. Additionally or alternatively, the thermoset may be adhesive. In some embodiments, the thermoplastic may be in the form of pellets or granules and can be shaped into a final product by softening and/or melting the granules and then molding. For example, processing or hardening of the thermoplastic may not involve curing or cross-linking.

In an embodiment, epoxy powders may be used to produce a surface that is substantially from of pin holes and/or porosity, which is also referred to as "A-class" or shinny surface in the auto industry. The epoxy powders may have a high Tg, such as an onset Tg of about 180° C. and can be used for paintable auto components. The epoxy powders may start to have thermal degradation at about 200° C., or higher temperature. The high Tg of the epoxy powders may facilitate producing a composite sandwich that may withstand high temperatures (e.g., temperatures required for post processing, such as e-coating process, primer application process, painting, etc.).

The method also may include an act 520 of disposing a stack assembly on and/or in the first mold portion and on and/or in contact with the powder. As described above, the stack assembly may include a first fiber sheet impregnated with a polymer resin (e.g., the first fiber sheet with polymer resin may be placed on the powder), a core blank, and a second fiber sheet impregnated with polymer resin positioned on the core blank, such that the core blank is positioned between the first and second impregnated fiber sheets.

The method may include an act 530 of closing the powder and the stack assembly in a processing volume of the mold formed by the first portion and a second portion of the closed mold. Moreover, the first and second portions of the mold may apply a selected pressure onto the powder and the stack assembly. In some embodiments, the method may include an act 540 of vacuuming the processing volume of the mold. Additionally or alternatively, the method may include an act 550 of heating the powder and/or the stack assembly by heating the first and second mold portions. The second mold portion may be heated to a lower temperature than the first mold portion, such that the polymer resin starts to gel from the second mold portion toward the first mold portion, or vice versa. This gel process may urge air trapped in the discontinuous fibers toward gaps between granules or pellets of the powder(s), such that the air may be removed by the vacuum. In some embodiments, the temperature difference between the first and second mold portions may be at least 5° C. For example, the temperature difference between the first and second mold portions may be at least 10° C., at least 15° C., etc. When the first mold portion is at a relatively low temperature, the powder may be warmed up without hardening. For example, the powder may have a gel time of about 90 seconds, which may allow the air trapped in the fibers of the fiber sheet to be at least partially removed (e.g., by natural aspiration and/or vacuum) to produce a substantially smooth surface finish.

In an embodiment, the curing temperature for the polymer resin used in the stack assembly may be about 120° C. For example, the first mold portion may be at 115° C., and the second mold portion may be at 125° C. Alternatively, for example, the curing temperature may be about 125° C., and the first mold portion may be at 120° C., while the second mold portion may be at 130° C. Generally, the cure time may vary from one embodiment to another. In at least one embodiment, the curing of the epoxy may take about 6-7 minutes for about 98% cured. When cured, the polymer resin may shrink about 2.5 to 3% (e.g., as compared with fill volume of uncured polymer resin).

In some embodiments, the temperature difference between the first and second mold portions may be at most 50° C. Under some processing conditions, when the temperature difference increases to about 50° C., the dimension difference due to different thermal expansions at different mold temperatures may be too large, such as to cause high local pressure(s) on the skin assembly when the mold is closed; this high local pressure may result in significant mold wear.

In some embodiments, for complete curing, the composite sandwich may be subjected to a post curing processing (e.g., heated in an oven or autoclave). For example, the oven may be heated at a 2° C. ramp from room temperature to an elevated temperature, which may be encountered during a post processing, such as e-coating. In an embodiment, the composite sandwich may be heated to about 180° C. and may be held for a period of time at the temperature (e.g., for one hour), which may facilitate or ensure a complete curing and may reduce or eliminate further shrinkage. The slow warm up during the post curing may reduce the possibility and/or effects of a thermal shock. To improve the efficiency of the utilization of the oven, a number of composite parts may be placed in the oven to go through the post curing process. Generally, the curing temperature and curing time may vary from one embodiment to the next and, among other things, may depend on the type of epoxy, thickness of epoxy, etc. For example, when the curing temperature increases, the curing time may be shorter.

In some embodiments, a mold release agent, such as wax, may be applied to facilitate removal of the composite sandwich from the first and/or second mold portion. Note that, in one or more embodiments, a silicone mold release may not be desirable for a surface that is intended to be painted. In some embodiments, the composite sandwich may be removed from the mold and may be cooled thereafter.

Figure 18:
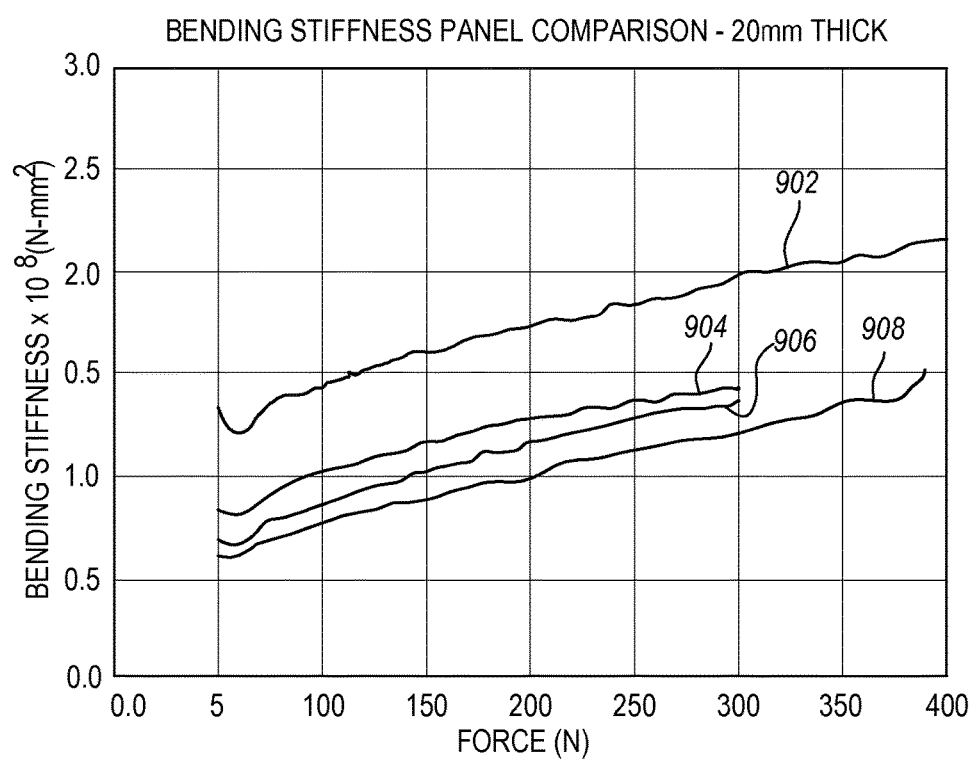
FIG. 18 is a graph comparing bending stiffness for panels of various configurations according to one or more embodiments.

FIG. 18 is a graph illustrating a comparison of bending stiffness for panels of various materials in accordance with embodiments of the present disclosure. These curves were obtained experimentally for composite sandwich panels with slight material variation. Curve 902 represents a hard core formed from polycarbonate drinking straws. Each straw has a 7 mm diameter, and the core has a density of 70 kg/cm3 (PC 7-70). The composite skins include 600 gsm glass fibers from a first supplier and 400 gsm NCF in epoxy. Curve 904 represents a core formed from polycarbonate drinking straws. Each straw has a 6 mm diameter and a density of 70 kg/cm3 (PC 6-70). The composite skin includes 600 gsm glass fibers from the first supplier in epoxy. Curve 906 represents PC 7-70 with 600 gsm glass fibers from the first supplier in epoxy. Curve 908 represents 6-70 with 600 gsm glass fibers from a second supplier in epoxy.

As shown, curve 902 has the highest bending stiffness. Specifically, curve 902 has higher bending stiffness than curve 906, which suggests that the additional NCF may increase the bending stiffness of the composite sandwich. Curve 902 shows higher bending stiffness than curve 906, which suggests that larger diameter of the tubes may increase the bending stiffness. Curve 904 shows higher bending stiffness than curve 908, which may suggest that supplier for the glass fibers may affect the bending stiffness.

The following sections provide details on calculating the stiffness, flexural strength for the composite skin and the composite sandwich based upon theoretical modeling. In addition, a comparison of various composite structures to aluminum is also provided. To obtain the bending stiffness, Tables 1.1-1.5 list the data including density, E-modulus, width, length, and thickness of the composite laminate or skin and aluminum, and also core height. The bending stiffness of aluminum or the composite skin, or composite sandwich is calculated based upon the equations, which are described in the following sections.

TABLE 1.1

Aluminum
ALUMINIUM
6061 T6 Alloy

| Parameter (units) | Value |
| --- | --- |
| E-Modulus (MPa) | 68900 |
| Density (kg/m³) | 2700 |
| Width (mm) | 1000 |
| Length (mm) | 1800 |
| Thickness (mm) | 1.2 |
| $I_z$ (mm⁴) | 144.00 |
| Bending stiffness × 10⁶ (N · mm²) | 9.92 |
| Weight (kg) | 5.83 |

TABLE 1.2

Carbon Fiber Laminate
Carbon Fiber (CF) in Epoxy Resin

| Parameter (units) | Value |
| --- | --- |
| CF density (g/cm³) | 1.78 |
| E-Modulus laminate (MPa) | 37733 |
| Target bending stiffness × 10⁶ (N · mm²) | 9.92 |
| Width (mm) | 1000 |
| Length (mm) | 1800 |
| Target thickness (mm) to equivalent Aluminum | 1.47 |

TABLE 1.3

Composite Sandwich with Polycarbonate Core and Epoxy
Skins: Carbon Fiber in Epoxy Resin
Core: Polycarbonate (6.0 mm diameter drinking straw;
70 kg/m³ density)

| Parameter (units) | Value |
| --- | --- |
| Core density (g/cm³) | 0.07 |
| E-Modulus laminate (MPa) | 37733 |

TABLE 1.3-continued

Composite Sandwich with Polycarbonate Core and Epoxy
Skins: Carbon Fiber in Epoxy Resin
Core: Polycarbonate (6.0 mm diameter drinking straw;
70 kg/m³ density)

| Parameter (units) | Value |
| --- | --- |
| Width (mm) | 1000 |
| Length (mm) | 1800 |
| Skin thickness (mm) | 0.60 |
| Core height (mm) | 20.00 |
| Distance between skins centers (mm) | 20.60 |
| Bending stiffness × 10⁶ (N · mm²) | 4803.7 |
| Ratio with respect to Aluminum stiffness | 484 |
| Aluminum thickness for equivalent bending stiffness (mm) | 9.42 |
| Composite flexural E-modulus (MPa) | 6050 |

TABLE 1.4

Composite Sandwich with Polycarbonate Core, Carbon Fiber,
and Polyurethane
Skins: 600 gsm Chopped Strand Mat (CSM) in
polyurethane
Core: Polycarbonate (6.0 mm in diameter drinking straw;
70 kg/m³ density)

| Parameter (units) | Value |
| --- | --- |
| Skin E-Modulus CSM in polyurethane (MPa) | 12050 |
| Experimental bending stiffness × 10⁶ (N · mm²) | 118 |
| Specimen average width (mm) | 50.55 |
| Specimen average thickness (mm) | 20.02 |
| Skin thickness | 0.75 mm |
| Core height (mm) | 18.42 |
| Composite Flexural E-modulus (MPa) | 3491 |
| Comparison to CF sandwich E-modulus | 0.58 |

TABLE 1.5

Composite Sandwich with Paper Core, Glass Fiber, and Polyurethane
Skins: 600 gsm CSM in polyurethane
Core: Paper Honeycomb (5.0 mm triangular cell; 80 kg/m³
density)

| Parameter (units) | Value |
| --- | --- |
| Skin E-Modulus CSM in Polyurethane (MPa) | 12700 |
| Composite Flexural E-modulus (MPa) | 2550 |
| Bending stiffness | TBD |
| Comparison to CF sandwich E-modulus | 0.42 |

Figure 19:
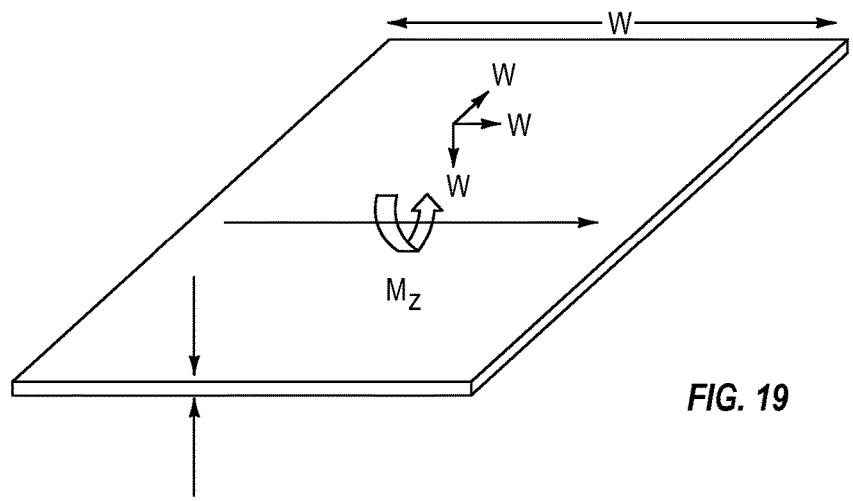
FIG. 19 is a diagram of a panel for calculating bending stiffness.

FIG. 19 is a diagram of a panel for calculating bending stiffness in accordance with embodiments of the present disclosure. The panel can be a composite skin, a composite sandwich, an aluminum sheet, etc. The dimensions, including thickness along the y-axis and width along the z-axis, are shown with respect to the x-y-z coordinates. As shown, the bending is around the z-axis.

The bending stiffness of a monolithic carbon fiber (CF) laminate may be expressed as the product of its elastic modulus by the moment of inertia in Equation (1):

$$D_{cf} = E_{cf} I_z = E_{cf} \cdot \frac{wt^3}{12} \qquad \text{Eq. (1)}$$

Where $D_{cf}$ denotes the bending stiffness of the CF laminate, $E_{cf}$ denotes the Elastic modulus of the CF laminate, and $I_z$ denotes the moment of inertia with respect to the z axis, w represents the width of the CF laminate, and t represents the thickness of the CF laminate. $I_z$ is dependent upon the thickness and width of the laminate.

The bending stiffness of a solid aluminum sheet may be expressed by Equation (1), but replacing $D_{cf}$ with the bending stiffness of aluminum $D_{Al}$, and replacing $E_{cf}$ with the elastic modulus of aluminum $E_{Al}$. If the CF laminate achieves the same bending stiffness as the aluminum sheet, the required thickness for the CF laminate can be obtained from the following Equation (2):

$$D_{cf} = D_{Al} \Rightarrow D_{Al} = E_{cf} \cdot \frac{wt_{cf}^3}{12} \qquad \text{Eq. (2)}$$

Therefore, the required thickness of the CF laminate can be calculated from Eq. (2) and obtained by the following Equation (3):

$$t_{cf} = \sqrt[3]{\frac{12 D_{Al}}{E_{cf} w}} \qquad \text{Eq. (3)}$$

Figure 20:
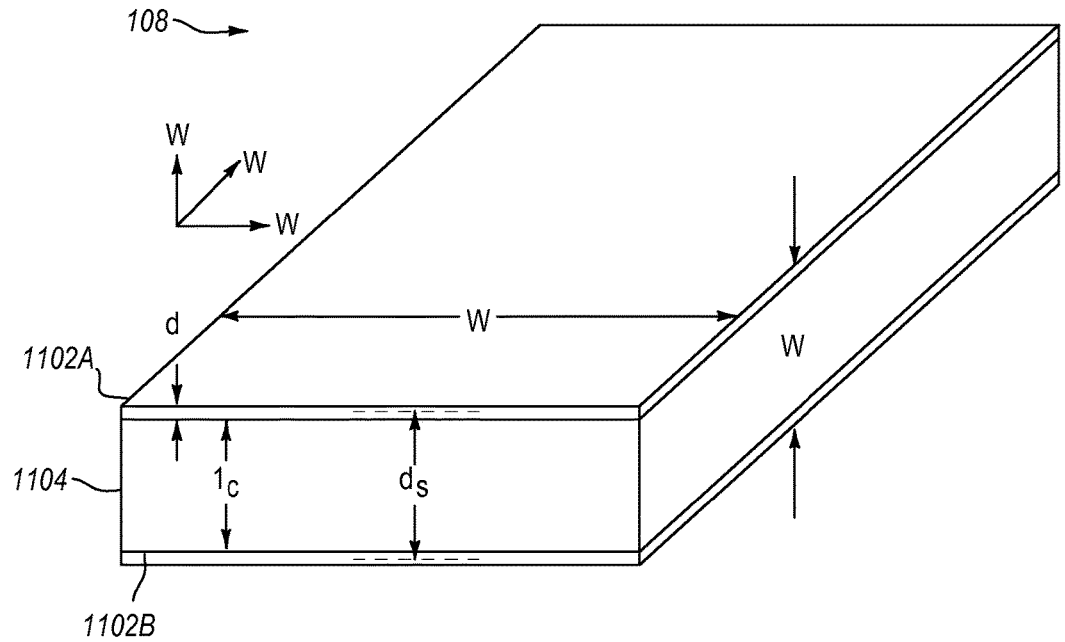
FIG. 20 is a diagram of a composite sandwich for calculating the bending stiffness thereof according to an embodiment.

FIG. 20 is a diagram of a composite sandwich for calculating the bending stiffness of the composite sandwich in accordance with embodiments of the present disclosure. The composite sandwich 1100 includes core 1104 sandwiched between a top composite skin 1102A and a bottom composite skin 1102B. The core may be a "hard" core, including tubes, such as plastic tubes, or high density foams or a "soft" core such as paperboards or cardboards or low density foams. As shown in FIG. 20, w denotes the width of the composite sandwich 1100, $t_c$ denotes the thickness or height of the core 1104, $t_s$ denotes the thickness of the composite skins 1102A and 1102B, and ds denotes the distance between the middle section of the composite skins 1102A-B (i.e., $t_c+t_s$).

For the composite sandwich 1100, the bending stiffness may be expressed as the sum of the flexural rigidities of the composite skins 1102A-B and core 1104 from the centroidal axis in Equation (4):

$$D_{sandwich} = D_{skins} + D_{core} \qquad \text{Eq. (4)}$$

Assuming symmetrical distribution and identical material(s) for the two skins or facings 1102A-B of the composite sandwich 1100, the bending stiffness of the composite sandwich 1100 may be expressed in terms of the moduli of elasticity and moment of inertia for the composite skins 1102A-B and the core 1104 by Equation (5):

$$D_{sandwich} = 2 E_{skin} I_{skin} + E_{core} I_{core} \qquad \text{Eq. (5)}$$

Applying Steiner's theorem to the skins 1102A-B, the moment of inertia of the skin 1102A or 1002B and core 1104 can be expressed in Equation (6):

$$\begin{cases} I_{core} = \frac{1}{12} w t_c^3 \\ I_{skin} = \frac{1}{12} w t_s^3 + w t_s \left(\frac{d_s}{2}\right)^2 \end{cases} \qquad \text{Eq. (6)}$$

Where w denotes the width of the composite beam, tc denotes the thickness of the core, $t_s$ denotes the thickness of the skin, and ds denotes the distance between the middle section of the skins ($t_c+t_s$).

Substituting Eq. (6) in Eq. (5) yields the following Eq. (7):

$$D_{sandwich} = \frac{E_{skin} w t_s^3}{6} + \frac{E_{skin} w t_s d_s^2}{2} + \frac{E_{core} w t_c^3}{12} \qquad \text{Eq. (7)}$$

As the contribution of the core 1104 to the bending stiffness of the composite sandwich 1100 is usually insignificant, which is less than 1%, due to the low modulus of elasticity of the core, the bending stiffness of the composite sandwich 1100 may be estimated by the following Eq. (8):

$$E_{core} = E_{skin} \Rightarrow D_{sandwich} \cong \frac{E_{skin} w t_s^3}{6} + \frac{E_{skin} w t_s d_s^2}{2} \qquad \text{Eq. (8)}$$

The first term of the bending stiffness in Eq. (8) may account for less than 2.5% if $d_s$ is greater than 4 $t_s$. In most cases, the composite skin 1102A or 1102B is thin while the composite core 1104 is significantly thicker than the composite skin 1102A or 1102B. Therefore, the bending stiffness of the composite sandwich 1100 may be estimated by the following Equation (9):

$$D_{sandwich} \cong \frac{E_{skin} w t_s d_s^2}{2} \qquad \text{Eq. (9)}$$

As shown by Eqs. (7)-(9), when the thickness $t_s$ of the composite skin increases, the bending stiffness of the composite sandwich also increases.

Figure 21A:
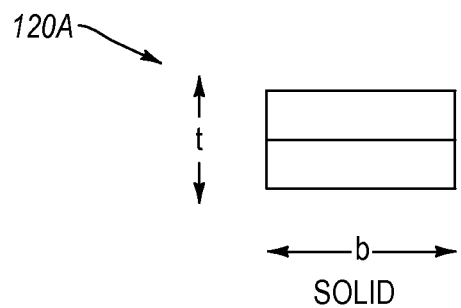
FIG. 21A is a side view of a composite structure according to an embodiment.

A few examples are provided below to illustrate the effect of core height on the bending stiffness. FIG. 21A is a diagram of a composite structure in accordance with embodiments of the present disclosure. In this embodiment, a solid composite structure 1200A includes two composite skins, which have a combined thickness t. The solid composite structure 1200A does not include any core (e.g., assuming that the core may be compressed to a zero thickness).

Figure 21B:
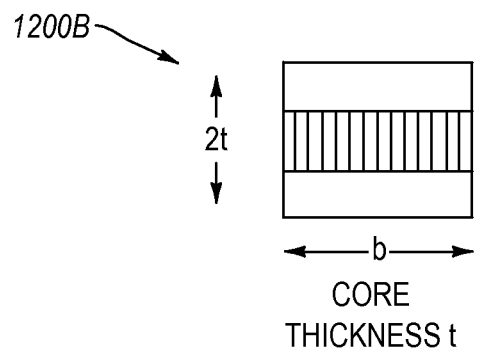
FIG. 21B is a side view of a composite sandwich according to an embodiment.

FIG. 21B is a diagram of a composite sandwich in accordance with another embodiment. In this embodiment, a composite sandwich 1200B includes two composite skins which have a combined thickness t. The composite sandwich 1200B also includes a core with a thickness t. The composite sandwich 1200B has a bending stiffness expressed by Eq. (10):

$$D_{sandwich\,core\,t} = \frac{7 b t^3}{12} = 7 D_{solid} \qquad \text{Eq. (10)}$$

Therefore, when the core has the same thickness as the skin layer of the solid composite structure 1200A, which includes both the top composite skin layer and the bottom composite skin layer, the bending stiffness of the composite structure 1200B increases to seven times of the bending stiffness of the solid composite structure 1200A.

Figure 21C:
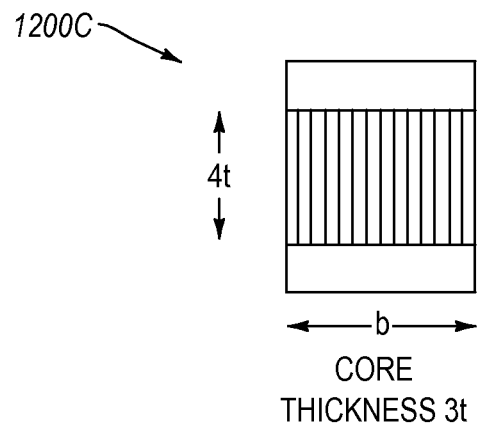
FIG. 21C is a side view of a composite sandwich according to another embodiment.

FIG. 21C is a diagram of a composite sandwich in accordance with yet another embodiment. In this example, a composite sandwich 1200C includes a core with a thickness of 3t while the combined thickness of the two skin layers is t, which is the thickness of the solid composite structure 1200A. The composite sandwich 1200C has a bending stiffness expressed by Eq. (11):

$$D_{sandwich_{core\,3t}} = \frac{37bt^3}{12} = 37 D_{solid} \qquad \text{Eq. (11)}$$

As shown in Eq. (11), the bending stiffness of the composite sandwich 1200C using a core of triple thickness with respect to the thickness t of the solid composite structure 1200A yields a bending stiffness of thirty seven times of the bending stiffness of the solid composite structure 1200A.

The flexural strength of the composite sandwich may be calculated using the following Eq. (12):

$$\sigma_{max} = \frac{M_{max}}{I/y_{max}} \qquad \text{Eq. (12)}$$

Where $\sigma_{max}$ denotes the flexural strength, $M_{max}$ denotes the maximum bending moment; I denotes the moment of inertia $y_{max}$ denotes the maximum distance ymax from the neutral axis.

For a common load configuration, Mmax remains as a constant for the solid composite structure 1200A and composite sandwiches 1200B-C. ymax may vary accordingly to the thickness of the solid composite structure 1200A and composite sandwiches 1200B-C, and the moment of inertia I may increase with the thickness as shown by Eq. (1).

Table 2 lists the comparison of stiffness, flexural strength and weight for solid composite structure 1200A and composite sandwiches 1200B-C shown in FIGS. 21A-C. As shown in Table 2, when the core height increases, the bending stiffness and the flexural strength of the composite sandwich may increase. Although taller core height is desired to increase bending stiffness, the core, such as made of polycarbonate drinking straws, may not be too long or too high, because the core may be more susceptible to buckling.

TABLE 2

Comparison of Solid Composite Structure and Composite Sandwiches

|  | Solid composite structure | Core thickness t | Core thickness 3t |
|---|---|---|---|
| Stiffness | 1.0 | 7.0 | 37.0 |
| Flexural strength | 1.0 | 3.5 | 9.2 |
| Weight | 1.0 | 1.02 | 1.06 |

As shown in Table 2, the core of the composite sandwiches represents about 2%-6% by weight of the solid composite structure, the bending stiffness and flexural strength of the composite sandwich can increase significantly without increasing the overall weight by the core.

Based upon the above equations, the thicknesses of the composite skin and aluminum sheet leading to equivalent bending stiffness are calculated and listed in Table 3. As shown, the thicknesses may depend on the E-modulus of the CF laminate. Also, the aluminum equivalent thickness is sensitive to the thickness of the CF skins of the composite sandwich. For the calculations, an average E-modulus value was inferred from the carbon fiber data, which was E=37.7 GPa.

TABLE 3

Composite skin thickness and equivalent aluminum sheet thickness versus the E-modulus of the carbon fiber laminate

| E-modulus (GPa) | Total composite thickness (mm) | Al thickness (mm) |
|---|---|---|
| 23 | 1.73 | 8.0 |
| 30 | 1.58 | 8.7 |
| 37.7 | 1.47 | 9.4 |
| 45 | 1.38 | 10.0 |
| 52 | 1.32 | 10.5 |

Table 4 lists various CF skin thicknesses and the equivalent aluminum thicknesses, assuming a constant E-modulus (E=37.7 GPa) to achieve the same bending stiffness.

TABLE 4

CF skin thickness vs. equivalent aluminum thickness for a constant E of 37.7 GPa

| Sandwich skin thickness (mm) for each skin | Aluminum thickness (mm) |
|---|---|
| 0.4 | 8.2 |
| 0.5 | 8.8 |
| 0.6 | 9.4 |
| 0.7 | 9.9 |
| 0.8 | 10.4 |

For the core formed from drinking straws, e.g., polycarbonate (PC), when the core height varies, the aluminum equivalent thicknesses also may vary. Assuming a constant E-modulus of 37.7 GPa and a thickness of 0.6 mm for each of the CF skins, Table 5 lists the variations in the PC core height vs. equivalent aluminum thickness to achieve the same bending stiffness.

TABLE 5

PC core height vs. equivalent aluminum thickness

| PC core height (mm) | Aluminum thickness (mm) |
|---|---|
| 4 | 3.9 |
| 8 | 5.9 |
| 12 | 7.5 |
| 16 | 9.0 |
| 20 | 9.4 |

Figure 22B:
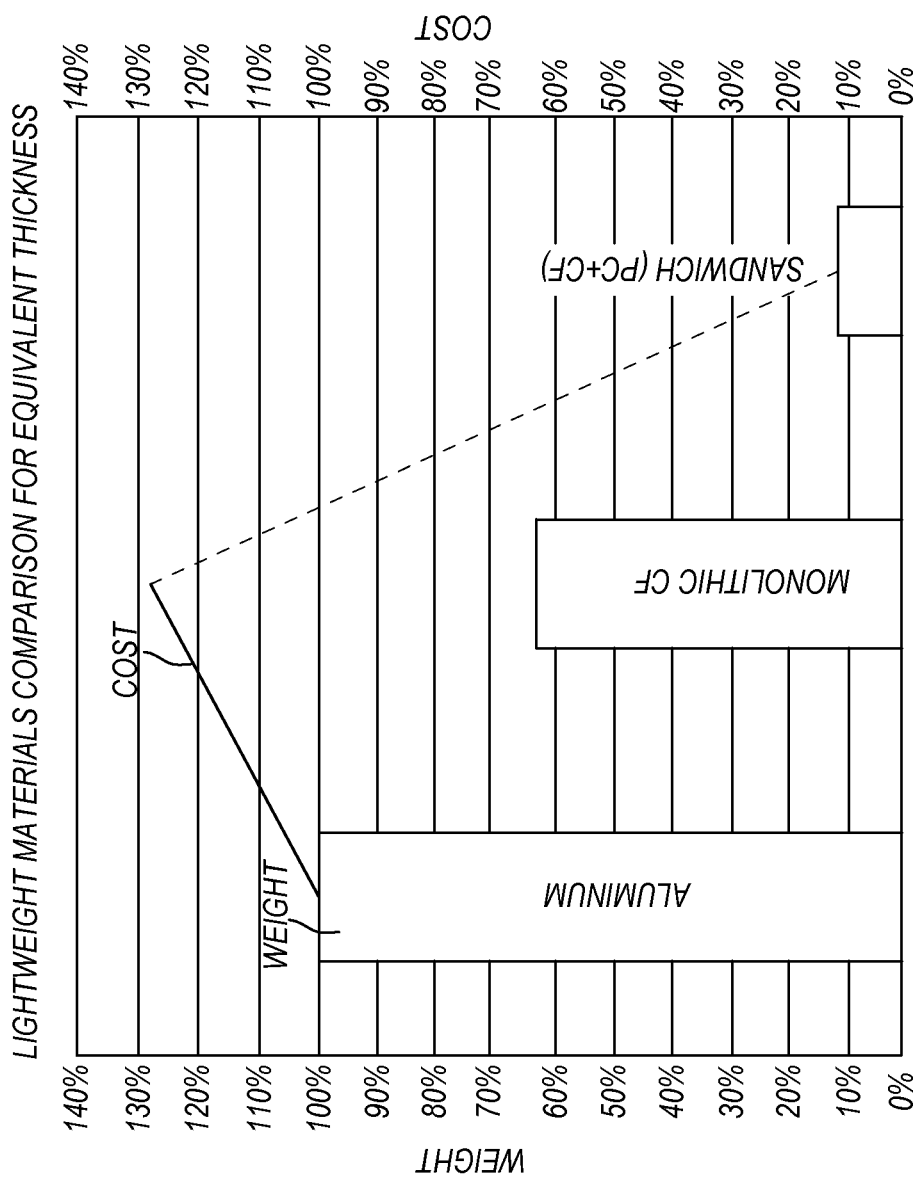
FIG. 22B is a graph illustrating material comparison by weight and cost for plates of equivalent stiffness.

Based upon the above equations, additional calculations can be performed and the data presented in FIGS. 22A and 22B. FIG. 22A is a graph illustrating material comparison by weight and cost for plates of equivalent thickness. As shown in FIG. 22A, for example, aluminum is the heaviest compared to monolithic carbon fiber laminate and composite sandwich that includes a core formed from polycarbonate tubes and composite skins, while the monolithic carbon fiber laminate has the highest cost. For example, the composite sandwich may weigh about 80% of the weight of the aluminum (of comparable thickness and size), and may cost about 50% of the cost of the aluminum. The monolithic carbon fiber laminate may weigh about 60% of the weight of the aluminum, and may cost about 130% of the cost of the aluminum.

FIG. 22B is a graph illustrating material comparison by weight and cost for plates of equivalent stiffness. As shown in FIG. 22B, the composite sandwich may have about 10% of the weight of the aluminum and about 10% of the cost of the aluminum to have the same or similar stiffness as the aluminum. In contrast, the monolithic carbon fiber laminate has about 60% of the weight of the aluminum, but about 130% of the cost of the aluminum to have the same or similar stiffness as the aluminum.

The following CF data and resin data was used to generate the bar graphs of FIGS. 22A-B, (1) aluminum 6061 T6 with a thickness of 20 mm; (2) monolithic carbon fiber laminate with a thickness of 20 mm, the E-modulus is 50 GPa; and (3) composite sandwich that includes a core bonded to and between two composite skins, each skin is 0.4 mm thick, the core height is 20 mm, the volume fraction of fiber is 40% in the composite skin, and the E-modulus is 35 GPa.

Figure 23:
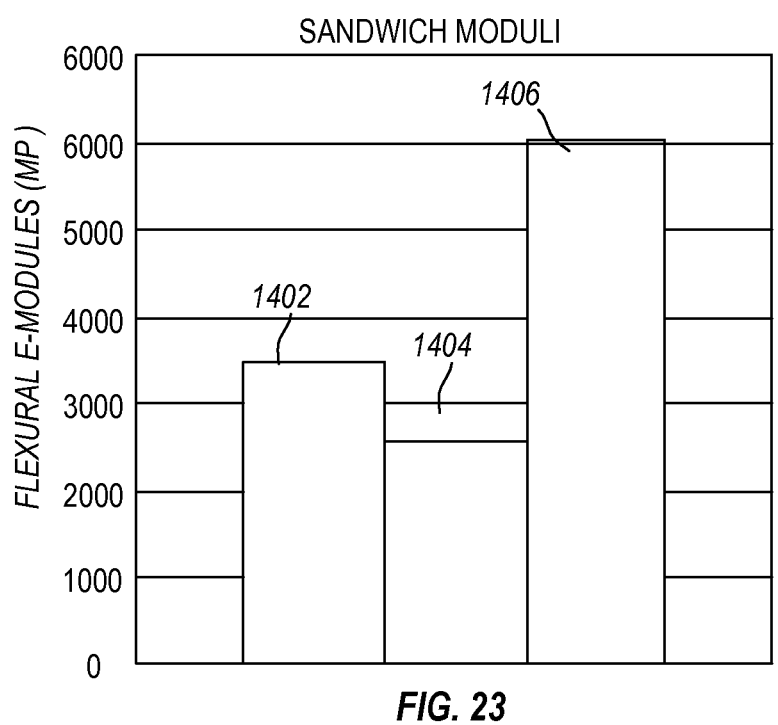
FIG. 23 is a bar graph that compares the flexural moduli for different composite sandwiches.

FIG. 23 is a bar graph that compares the flexural moduli for different composite sandwiches. The flexural modulus is an inherent property for the material and is not dependent on geometry. As shown in FIG. 23, bar 1406 represents the flexural modulus of a composite sandwich that includes a polycarbonate core sandwiched between composite skins including epoxy, which has the highest flexural E-modulus among all composite sandwiches. Bar 1404 represents the flexural modulus of a composite sandwich that include a paper sandwiched between composite skins fabricated from chopped strand mat (CSM) impregnated with polyurethane has the lowest flexural modulus. Bar 1402 represents the flexural modulus of a composite sandwich that includes a polycarbonate core and a softer composite skin including polyurethane instead of epoxy, and has a lower flexural modulus than the composite sandwich represented by the bar 1406.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A composite sandwich, comprising:
a first composite skin including a plurality of reinforcement fibers embedded in a polymer matrix;
a second composite skin including a plurality of reinforcement fibers embedded in a polymer matrix;
a polymer core positioned between the first and second composite skins and bonded thereto, the polymer core including a plurality of cells defined by corresponding cell walls that are substantially perpendicular to the first composite skin;
wherein at least some of the cell walls are at least one of deformed or melted; and
a foam that bonds the polymer core to the first composite skin, the foam extending into one or more cavities of the plurality of cells.

2. The composite sandwich of claim 1 wherein the cells include corresponding cavities defined by tubular members.

3. The composite sandwich of claim 2 wherein the polymer core includes a first portion including a plurality of tubular members of a first size, and a second portion including a plurality of tubular members of a second size, the first size being greater than the second size.

4. The composite sandwich of claim 2 wherein the tubular members are bonded together.

5. The composite sandwich of claim 1 wherein the foam includes one or more of epoxy or polyurethane.

6. The composite sandwich of claim 5 wherein the foam extends between the first and second composite skins.

7. The composite sandwich of claim 1 wherein the reinforcement fibers include one or more of discontinuous fibers or continuous fibers.

8. The composite sandwich of claim 1 wherein the core includes a first portion having a first thickness and a second portion having a second thickness.

9. The composite sandwich of claim 1 wherein the first composite skin, the second composite skin, and the core define a three-dimensional shape of the composite sandwich.

10. The composite sandwich of claim 1 further comprising a non-crimp fabric or a woven fabric bonded to the first composite skin or to second composite skin.

11. A method of fabricating a composite sandwich, the method comprising:
assembling a stack assembly including:
a first fiber sheet impregnated with a polymer resin;
a second fiber sheet impregnated with a polymer resin; and
a polymer core blank positioned between the first and second fiber sheets, the core blank including a plurality of tubular members defined by corresponding cell walls that are substantially perpendicular to the first fiber sheet;
positioning the stack assembly between a first mold portion and a second mold portion; and
heating and applying pressure to the stack assembly by compressing the stack assembly between the first mold portion and the second mold portion, thereby to bond the first and second fiber sheets to the polymer core blank to form the composite sandwich and to cause a foam to extend into one or more cavities of the plurality of tubular members, and wherein compressing the stack assembly includes one or more of bending, buckling, or melting at least some of the cells walls of at least some of the plurality of tubular members in the core blank.

12. The method of claim 11 wherein heating and applying pressure to the stack assembly to bond the first and second fiber sheets to the polymer core blank to form the composite sandwich includes compressing a first portion of the core blank to a first thickness and compressing a second portion of the core blank to a second thickness that is greater than the first thickness.

13. The method of claim 11, further comprising bonding together the tubular members.

14. The method of claim 11, further comprising one or more of forming a foam between the first fiber sheet impregnated with a polymer resin and the core blank or forming a foam between the second fiber sheet impregnated with a polymer resin and the core blank.

15. The method of claim 11 wherein heating and applying pressure to the stack assembly includes heating the second mold portion to a higher temperature than the first mold portion.

16. The method of claim 11 wherein applying pressure to the stack assembly includes applying pressure from about 5 bars to about 10 bars.

17. The composite sandwich of claim 1, further comprising additional foam that bonds the polymer core to the second composite skin.

18. The composite sandwich of claim 1, wherein the foam only partially extends into one or more cavities of the plurality of cells.

* * * * *